United States Patent
Murakami et al.

(10) Patent No.: US 9,347,377 B2
(45) Date of Patent: May 24, 2016

(54) GAS TURBINE AND GAS-TURBINE PLANT HAVING THE SAME

(75) Inventors: Masayuki Murakami, Tokyo (JP); Kazuya Higashi, Tokyo (JP); Yukimasa Nakamoto, Tokyo (JP); Satoko Fujii, Tokyo (JP); Takeyuki Shimizu, Tokyo (JP); Keigo Matsumoto, Tokyo (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 140 days.

(21) Appl. No.: 13/806,961

(22) PCT Filed: Oct. 27, 2011

(86) PCT No.: PCT/JP2011/074853
§ 371 (c)(1),
(2), (4) Date: Dec. 26, 2012

(87) PCT Pub. No.: WO2012/057282
PCT Pub. Date: May 3, 2012

(65) Prior Publication Data
US 2013/0091824 A1 Apr. 18, 2013

(30) Foreign Application Priority Data
Oct. 28, 2010 (JP) .................................. 2010-242397

(51) Int. Cl.
*F02C 7/30* (2006.01)
*F02C 7/232* (2006.01)
(Continued)

(52) U.S. Cl.
CPC ................ *F02C 7/232* (2013.01); *F01D 25/12* (2013.01); *F02C 3/30* (2013.01); *F02C 7/14* (2013.01);
(Continued)

(58) Field of Classification Search
CPC ............ F23R 3/36; F23D 2209/30; F02C 7/30
USPC .................. 60/39.094, 39.463, 746, 266, 267
See application file for complete search history.

(56) References Cited

U.S. PATENT DOCUMENTS

| 5,329,760 A | 7/1994 | Bradley et al. |
| 5,408,830 A | 4/1995 | Lovett |

(Continued)

FOREIGN PATENT DOCUMENTS

| CN | 1971012 A | 5/2007 |
| CN | 101365913 A | 2/2009 |

(Continued)

OTHER PUBLICATIONS

International Search Report for PCT/JP2011/074853, mailing date of Jan. 24, 2012.
(Continued)

*Primary Examiner* — Gerald L Sung
(74) *Attorney, Agent, or Firm* — Westerman, Hattori, Daniels & Adrian, LLP

(57) ABSTRACT

The invention provides a gas-turbine fuel nozzle that includes a plurality of fuel supply channels to which fuel is supplied, a plurality of fuel/sweep-fluid supply channels to which fuel or a sweep fluid for sweeping the fuel is supplied, and a plurality of injection holes that are provided at downstream ends of the fuel supply channels or the fuel/sweep-fluid supply channels and that inject the fuel guided from the fuel supply channels or the fuel/sweep-fluid supply channels; a sweep-fluid supply channel that is connected to the fuel/sweep-fluid supply channels to guide the sweeping; and sweep-fluid cooling means for cooling the sweep-fluid to a temperature lower than a self-ignition temperature of the fuel.

19 Claims, 17 Drawing Sheets

(51) Int. Cl.
*F01D 25/12* (2006.01)
*F02C 3/30* (2006.01)
*F02C 9/40* (2006.01)
*F23R 3/34* (2006.01)
*F23R 3/36* (2006.01)
*F02C 7/14* (2006.01)
*F02C 7/22* (2006.01)
*F02C 7/228* (2006.01)
*F23R 3/28* (2006.01)

(52) U.S. Cl.
CPC ............... *F02C 7/222* (2013.01); *F02C 7/228* (2013.01); *F02C 9/40* (2013.01); *F23R 3/283* (2013.01); *F23R 3/343* (2013.01); *F23R 3/36* (2013.01); *F05D 2260/213* (2013.01); *F05D 2260/2214* (2013.01); *F05D 2260/608* (2013.01); *F23D 2209/30* (2013.01); *F23K 2301/203* (2013.01)

(56) References Cited

U.S. PATENT DOCUMENTS

| | | | | |
|---|---|---|---|---|
| 5,435,126 | A | * | 7/1995 | Beaudoin ............... 60/39.463 |
| 5,720,164 | A | | 2/1998 | Corbett et al. |
| 5,966,926 | A | * | 10/1999 | Shekleton et al. ......... 60/39.094 |
| 6,145,318 | A | * | 11/2000 | Kaplan et al. ............... 60/728 |
| 6,363,724 | B1 | | 4/2002 | Bechtel et al. |
| 6,539,724 | B2 | * | 4/2003 | Cornwell et al. ............ 60/776 |
| 2002/0026785 | A1 | | 3/2002 | Nakamoto |
| 2002/0073709 | A1 | | 6/2002 | Bechtel et al. |
| 2002/0073710 | A1 | | 6/2002 | Bechtel et al. |
| 2009/0071119 | A1 | * | 3/2009 | Kervistin et al. ......... 60/39.094 |
| 2009/0165435 | A1 | * | 7/2009 | Koranek ............... 60/39.463 |

FOREIGN PATENT DOCUMENTS

| | | |
|---|---|---|
| EP | 1471308 A1 | 10/2004 |
| JP | 7-305848 A | 11/1995 |
| JP | 2002-071135 A | 3/2002 |
| JP | 2004-012039 A | 1/2004 |
| JP | 2004-143942 A | 5/2004 |
| JP | 2004-211558 A | 7/2004 |
| JP | 2005-195284 A | 7/2005 |
| JP | 2007-155170 A | 6/2007 |

OTHER PUBLICATIONS

Decision to Grant a Patent dated May 20, 2014, issued in Corresponding Korean Patent Application No. 10-2012-7030359 with Concise Explanation of Relevance (3 pages).

Decision to Grant a Patent dated May 27, 2014, issued in Corresponding Japanese Patent Application No. 2012-540940 with Concise Explanation of Relevance (4 pages).

Liu et al. "Experimental Study of Double Fuel Injector Group of Heavy-duty Gas Turbine", Test and Research on Gas Turbine, pp. 19-22, vol. 22, No. 1, China Academic Journal Electronic Publishing House, China, Feb. 2009, with English Abstract, Cited in CN Office Action dated Nov. 4, 2014.

Office Action dated Nov. 4, 2014, issued in corresponding Chinese Patent Application No. 2011800265134, with English Translation (11 pages).

Extended European Search Report dated Dec. 11, 2014, issued in corresponding European Patent Application No. 11836415.7 (6 pages).

Decision to Grant a Patent dated Jun. 4, 2015, issued in counterpart Chinese Patent Application No. 201180026513.4, w/English translation (2 pages). Explanation of Relevance—"The Decision to Grant a Patent has been received."

* cited by examiner

US 9,347,377 B2

GAS TURBINE AND GAS-TURBINE PLANT HAVING THE SAME

TECHNICAL FIELD

The present invention relates to a gas turbine and a gas-turbine plant having the same and relates to sweeping at the time of combustion.

BACKGROUND ART

A general combustor provided in a gas turbine is provided with a pilot nozzle and main nozzles. A flame obtained by combusting fuel injected from the pilot nozzle is used as a pilot burner for combustion with the main nozzles. In the case of a dual-fuel firing combustor in which combustion is performed by selectively using fuel gas and fuel oil as fuel, there is a risk of high-temperature combustion gas flowing back to the pilot nozzle while the fuel gas is not injected as fuel during an oil-firing operation, causing burnout of the pilot nozzle. Therefore, the pilot nozzle is swept by using air guided from a casing of the gas turbine (for example, see Cited Document 1).

Furthermore, PTL 2 discloses performing staging processing, in which a predetermined number of blocks into which a plurality of main nozzles provided in the combustor are grouped are sequentially operated and stopped, thereby making it possible to prevent sudden ignition in the main nozzles when combustion with the pilot nozzle is switched to combustion with the main nozzles and to prevent damage to the gas turbine.

CITATION LIST

Patent Literature

{PTL 1} Japanese Unexamined Patent Application, Publication No. 2005-195284
{PTL 2} Japanese Unexamined Patent Application, Publication No. 2004-143942

SUMMARY OF INVENTION

Technical Problem

However, because the self-ignition temperature of methane, which is a major component of fuel gas, is about 445° C., the invention described in PTL 1 has a problem in that there is a possibility that the fuel gas will self-ignite and catch fire when sweeping is performed by using air guided from the casing, whose maximum temperature reaches about 500° C.

Furthermore, the invention described in PTL 2 discloses how to prevent damage to the gas turbine by smoothly performing the staging processing but does not disclose a countermeasure which prevents the fuel gas from catching fire due to self-ignition of the fuel gas remaining in the main nozzles from which injection of the fuel gas is stopped by the staging processing.

The present invention has been made in view of such circumstances, and an object thereof is to provide a gas turbine capable of performing sweeping while preventing self-ignition of fuel and a gas-turbine plant having the same.

Solution to Problem

In order to solve the above-described problems, a gas turbine of the present invention and a gas-turbine plant having the same employ the following solutions.

Specifically, according to a first aspect, the present invention provides a gas turbine including: a gas-turbine fuel nozzle that includes a plurality of fuel supply channels to which fuel is supplied, a plurality of fuel/sweep-fluid supply channels to which fuel or a sweep-fluid for sweeping the fuel is supplied, and a plurality of injection holes that are provided at downstream ends of the fuel supply channels or the fuel/sweep-fluid supply channels and that inject the fuel guided from the fuel supply channels or the fuel/sweep-fluid supply channels; a sweep-fluid supply channel that is connected to the fuel/sweep-fluid supply channels and guides the sweep fluid; and sweep-fluid cooling means for cooling the sweep fluid to a temperature lower than a self-ignition temperature of the fuel.

In the gas-turbine fuel nozzle, in which fuel gas is used as the fuel, air extracted from the casing of the gas turbine is guided to the fuel/sweep-fluid supply channels to perform sweeping, in order to prevent a situation in which high-temperature combustion gas flows back to the injection holes while the fuel gas is not injected, causing burnout of the gas-turbine fuel nozzle. However, if air having a high temperature close to the self-ignition temperature of the fuel gas is guided to the fuel/sweep-fluid supply channels, there is a risk that the fuel gas remaining in the fuel/sweep-fluid supply channels will be ignited, causing burnout of the gas-turbine fuel nozzle, and that the fuel gas will self-ignite, causing an explosion.

Thus, the sweep fluid cooled to a temperature lower than the self-ignition temperature of the fuel by the sweep-fluid cooling means is guided to the fuel/sweep-fluid supply channels of the gas-turbine fuel nozzle from the sweep-fluid supply channel. Thus, it is possible to prevent self-ignition of the fuel remaining in the fuel/sweep-fluid supply channels and to prevent burnout of the gas-turbine fuel nozzle. Therefore, the soundness of the gas turbine can be maintained.

Furthermore, the gas turbine according to the first aspect of the present invention may have a structure in which the sweep-fluid supply channel is connected to the fuel/sweep-fluid supply channels and to a casing of the gas turbine and guides, as the sweep fluid, a fluid extracted from the casing; and the sweep-fluid cooling means is a plurality of projections that are provided around the sweep-fluid supply channel.

As the sweep-fluid cooling means, the plurality of projections are provided around the sweep-fluid supply channel, which connects the fuel/sweep-fluid supply channels and the casing of the gas turbine. Thus, the sweep fluid guided to the sweep-fluid supply channel from the casing, whose maximum temperature reaches about 500° C. during the operation of the gas turbine, can be cooled through heat release with the plurality of projections provided around the sweep-fluid supply channel. The temperature of the sweep fluid can be made lower than the self-ignition temperature of the fuel through heat release with the projections. Therefore, the sweep fluid guided from the sweep-fluid supply channel to the fuel/sweep-fluid supply channels can be cooled to a temperature lower than the self-ignition temperature of the fuel.

Furthermore, in the above-described structure, the plurality of projections may be provided close to suction ports for ventilation fans provided on a gas-turbine outer case that encloses the gas turbine.

The plurality of projections are provided close to the suction ports for the ventilation fans provided on the gas-turbine outer case, which encloses the gas turbine. Thus, air suctioned into the ventilation fans can be brought into positive contact with the projections provided around the sweep-fluid supply channel. Therefore, heat release of the sweep fluid guided to the sweep-fluid supply channel can be promoted.

Furthermore, the gas turbine according to the first aspect of the present invention may have a structure in which the sweep-fluid supply channel is connected to the fuel/sweep-fluid supply channels and to a casing of the gas turbine and guides, as the sweep fluid, a fluid extracted from the casing; and the sweep-fluid cooling means is heat-exchange means that is provided in the sweep-fluid supply channel and that performs heat exchange between a cooling medium and the sweep fluid.

As the sweep-fluid cooling means, the heat-exchange means provided in the sweep-fluid supply channel is used to perform heat exchange between the cooling medium and the high-temperature (for example, about 500° C.) fluid extracted from the casing of the gas turbine, which serves as the sweep fluid. Thus, cooled sweep fluid can be guided to the fuel/sweep-fluid supply channels. Therefore, the sweep fluid to be guided to the fuel/sweep-fluid supply channels can be cooled to a temperature lower than the self-ignition temperature of the fuel.

Furthermore, in the above-described structure, the heat-exchange means may be a gas-turbine cooling-air cooler; and the sweep fluid may be part of the fluid cooled by the gas-turbine cooling-air cooler.

In a general gas turbine driven by high-temperature combustion gas, in order to cool its turbine shaft and turbine blades, high-pressure air in the casing is extracted, is cooled in a gas-turbine cooling-air cooler (TCA cooler), and is then supplied to the turbine shaft and the turbine blades, thus cooling them.

Therefore, in the present invention, part of the fluid cooled by the gas-turbine cooling-air cooler is used as the sweep fluid. Thus, it is not necessary to separately provide heat-exchange means for cooling the sweep fluid. Therefore, the facility costs can be reduced.

Furthermore, in the above-described structure, the heat-exchange means may be of a water cooling type that uses water as the cooling medium.

Water is used as the cooling medium in the heat-exchange means for cooling the sweep fluid. Thus, the sweep fluid can be efficiently cooled, compared with air-cooled heat-exchange means.

Furthermore, the gas turbine according to the first aspect of the present invention may have a structure in which the sweep-fluid cooling means is a compressor that supplies compressed air to the sweep-fluid supply channel as the sweep fluid.

The compressor is used as the sweep-fluid cooling means. Thus, air that has been increased in pressure and reduced in temperature by the compressor can be guided to the sweep-fluid supply channel as the sweep fluid. Therefore, sweep fluid cooled to a temperature lower than the self-ignition temperature of the fuel can be guided to the fuel/sweep-fluid supply channels.

Furthermore, the gas turbine according to the first aspect of the present invention may further include, on an upstream side of the fuel/sweep-fluid supply channels, a fuel-flow-rate control valve that controls the flow rate of the fuel, a fuel-pressure control valve that controls the pressure of the fuel, and atmospheric discharge means that is provided at a portion between the fuel-flow-rate control valve and the fuel-pressure control valve and that discharges, to the atmosphere, the sweep fluid that has been guided to the portion between the fuel-flow-rate control valve and the fuel-pressure control valve.

The atmospheric discharge means is provided at the portion between the fuel-pressure control valve that controls the pressure of the fuel and the fuel-flow-rate control valve that controls the flow rate of the fuel, which are provided on the upstream side of the fuel/sweep-fluid supply channels, to discharge the sweep fluid guided to the portion between the fuel-flow-rate control valve and the fuel-pressure control valve to the atmosphere. Thus, even if the sweep fluid guided from the fuel/sweep-fluid supply channels flows into the portion between the fuel-flow-rate control valve and the fuel-pressure control valve, the sweep fluid can be discharged to the atmosphere by the atmospheric discharge means. Therefore, it is possible to prevent a situation in which the sweep fluid is mixed into the fuel existing in the portion between the fuel-flow-rate control valve and the fuel-pressure control valve to cause an explosion.

Furthermore, the gas turbine according to the first aspect of the present invention may have a structure in which the sweep-fluid supply channel includes a sweep-fluid supply on-off valve on a downstream side of the sweep-fluid cooling means and a sweep-fluid discharge channel that extends from a portion between the sweep-fluid cooling means and the sweep-fluid supply on-off valve; the sweep-fluid discharge channel includes a sweep-fluid discharge on-off valve; and, when the gas turbine is started-up, the sweep-fluid supply on-off valve is completely closed, and the sweep-fluid discharge on-off valve is completely opened.

At the time of start-up of the gas turbine, when the temperature of the sweep fluid has not been increased enough or when the sweep-fluid supply channel has not been warmed up, if the sweep fluid whose temperature has not been increased is cooled by the sweep-fluid cooling means, there is a possibility that the sweep fluid will be condensed, causing a drain flow. If the fuel is supplied to the fuel/sweep-fluid channels to operate the gas turbine after the sweep fluid containing the drain flow is supplied to the fuel/sweep-fluid supply channels, the drain flow will be mixed into the fuel.

Thus, the sweep-fluid supply on-off valve is provided on the downstream side of the sweep-fluid cooling means, and the sweep-fluid discharge channel extends from the portion between the sweep-fluid supply on-off valve and the sweep-fluid cooling means. Furthermore, the sweep-fluid discharge channel is provided with the sweep-fluid discharge on-off valve, and, when the gas turbine is started-up, the sweep-fluid supply on-off valve is completely closed, and the sweep-fluid discharge on-off valve is completely opened. Thus, a drain flow generated when the gas turbine is started-up can be discharged from the sweep-fluid discharge channel. Therefore, it is possible to prevent the drain flow from being mixed into the fuel to be injected from the injection holes via the fuel/sweep-fluid supply channels.

Furthermore, in the above-described structure, the sweep-fluid supply on-off valves may be provided at two positions on the downstream side of the sweep-fluid discharge channel; a sweep-fluid depressurizing channel may extend from a portion of the sweep-fluid supply channel between the sweep-fluid supply on-off valves; the sweep-fluid depressurizing channel may include a sweep-fluid depressurizing on-off valve that is operated in conjunction with actuation of at least one of the sweep-fluid supply on-off valves; and the sweep-fluid depressurizing on-off valve may be completely opened when at least one of the sweep-fluid supply on-off valves is completely closed.

The supply of the sweep fluid to the fuel/sweep-fluid supply channels can be shut off by completely closing the sweep-fluid supply on-off valve.

Therefore, the sweep-fluid supply on-off valves are provided at two positions in the sweep-fluid supply channel on the downstream side of the sweep-fluid discharge channel. Since the sweep-fluid supply on-off valves are redundantly provided in this way, even if a fault occurs in one of the sweep-fluid supply on-off valves, the other one of the sweep-fluid supply on-off valves can prevent the fuel from flowing back from the fuel/sweep-fluid supply channels.

Furthermore, the sweep-fluid depressurizing channel extends from the portion between the sweep-fluid supply on-off valves, which are provided at two positions, and the sweep-fluid depressurizing channel is provided with the sweep-fluid depressurizing on-off valve that is operated in conjunction with at least one of the sweep-fluid supply on-off valves. Thus, even if the fuel flows back from the fuel/sweep-fluid supply channels to the sweep-fluid supply channel, the fuel can be exhausted from the sweep-fluid depressurizing channel. Therefore, the gas turbine can be safely operated.

Furthermore, the above-described structure may further include: degree-of-opening detection means that is provided in the sweep-fluid supply on-off valves for detecting the degrees-of-opening thereof; and a control device that has a load reduction function for reducing an operating load on the gas turbine and an emergency stop function for stopping the operation of the gas turbine, wherein the control device may activate the emergency stop function and/or the load reduction function when the control device determines that the sweep-fluid supply on-off valves are in abnormal states based on the degrees-of-opening detected by the degree-of-opening detection means.

The sweep-fluid supply on-off valves are provided with the degree-of-opening detection means for detecting the degrees-of-opening thereof, and, when the control device determines that the degrees-of-opening of the sweep-fluid supply on-off valves are abnormal, the emergency stop function for stopping the operation of the gas turbine and/or the load reduction function for reducing the operating load on the gas turbine is activated. Thus, if the sweep-fluid supply on-off valves are not completely opened when the sweep-fluid supply on-off valves are instructed to be completely opened, it is possible to prevent a situation in which, for example, deficient sweep fluid guided to the fuel/sweep-fluid supply channels damages the nozzle of the gas turbine, thus interfering with the operation of the gas turbine.

Furthermore, the gas turbine according to the first aspect of the present invention may further include: temperature detection means that is provided on the downstream side of the sweep-fluid cooling means and detects the temperature of the sweep fluid taken out from the sweep-fluid cooling means; and a control device that has a load reduction function for reducing the operating load on the gas turbine, wherein the control device may activate the load reduction function when the control device determines that the temperature of the sweep fluid detected by the temperature detection means is equal to or higher than a self-ignition temperature of the fuel.

The temperature detection means for detecting the temperature of the sweep fluid cooled by the sweep-fluid cooling means is provided on the downstream side of the sweep-fluid cooling means, and, when the temperature detection means detects that the sweep fluid has a temperature equal to or higher than the self-ignition temperature of the fuel, the control device activates the load reduction function for reducing the operating load on the gas turbine. Thus, if the temperature of the sweep fluid to be guided to the fuel/sweep-fluid supply channels becomes equal to or higher than the self-ignition temperature of the fuel due to a fault in the sweep-fluid cooling means etc., it is possible to reduce the operating load on the gas turbine and to reduce the temperature of the sweep fluid extracted from the casing of the gas turbine. Thus, the reduced-temperature sweep fluid can be supplied to the fuel/sweep-fluid supply channels. Therefore, the soundness of the gas turbine can be ensured.

Furthermore, in the above-described structure, an orifice may be provided on a downstream side of the sweep-fluid discharge on-off valve or on a downstream side of the sweep-fluid depressurizing on-off valve.

The orifice is provided on the downstream side of the sweep-fluid discharge on-off valve or the sweep-fluid depressurizing on-off valve. Thus, when the sweep fluid is supplied to the fuel/sweep-fluid supply channels, even if the sweep-fluid discharge on-off valve or the sweep-fluid depressurizing on-off valve is in an abnormal state and is not completely closed, the orifice can limit the flow rate of the sweep fluid to be exhausted to the atmosphere from the sweep-fluid discharge channel or the sweep-fluid depressurizing channel. Thus, it is possible to prevent a situation in which, for example, deficient sweep fluid guided to the fuel/sweep-fluid supply channels damages the nozzle of the gas turbine, thus interfering with the operation of the gas turbine. Therefore, the gas turbine can be operated while maintaining the soundness thereof.

Furthermore, the gas turbine according to the first aspect of the present invention may have a structure in which the gas-turbine fuel nozzle is a pilot nozzle to which gaseous fuel is guided as the fuel, the gaseous fuel that is combusted by a diffusion method is supplied to the fuel/sweep-fluid supply channels, and the gaseous fuel that is combusted by a premix method is supplied to the fuel supply channels.

The sweep fluid cooled to a temperature lower than the self-ignition temperature of the gaseous fuel by the sweep-fluid cooling means is guided from the sweep-fluid supply channel to the fuel/sweep-fluid supply channels, to which the gaseous fuel combusted by the diffusion method is guided. Thus, it is possible to prevent self-ignition of the gaseous fuel remaining in the fuel/sweep-fluid supply channels and to prevent burnout of the pilot nozzle. Therefore, the soundness of the gas turbine can be maintained.

Furthermore, the gas turbine according to the first aspect of the present invention may have a structure in which, at the time of load rejection, the control device stops the supply of the sweep fluid and increases the flow rate of the fuel that is combusted by a premix method and that is supplied to the fuel supply channels.

If load rejection occurs while the sweep action is set to on, the diffusion pilot fuel for maintaining the flame cannot be injected immediately. Therefore, at the time of load rejection, the flow rate of the premixed pilot fuel gas supplied to the premixed-fuel supply pipes $3a$ is increased for a certain period of time. Thus, it is possible to depressurize the diffusion fuel supply pipes $3b$ to which the sweep air has been supplied and to stabilize the flame.

Furthermore, the gas turbine according to the first aspect of the present invention may have a structure in which the gas-turbine fuel nozzle is a dual-fuel firing pilot nozzle to which gaseous fuel or liquid fuel is guided as the fuel, the gaseous fuel that is combusted by the diffusion method is supplied to the fuel/sweep-fluid supply channels, and the liquid fuel that is combusted by the diffusion method is supplied to the fuel supply channels.

The sweep fluid cooled to a temperature lower than the self-ignition temperature of the gaseous fuel by the sweep-fluid cooling means is guided from the sweep-fluid supply channel to the fuel/sweep-fluid supply channels, to which the gaseous fuel combusted by the diffusion method is supplied.

Thus, during the liquid-fuel firing operation of the gas turbine, the sweep fluid cooled to a temperature lower than the self-ignition temperature is guided to the fuel/sweep-fluid supply channels, thereby making it possible to prevent self-ignition of the gaseous fuel remaining in the fuel/sweep-fluid supply channels and to prevent burnout of the pilot nozzle. Therefore, the soundness of the gas turbine can be maintained.

Furthermore, the gas turbine according to the first aspect of the present invention may have a structure in which the gas-turbine fuel nozzle is a main nozzle in which gaseous fuel that is combusted by the premix method is supplied to the fuel/sweep-fluid supply channels, as the fuel, or the sweep fluid is supplied to the fuel/sweep-fluid supply channels; and a plurality of the main nozzles are provided, and the sweep fluid is supplied to some of the main nozzles according to the operation of the gas turbine.

When the gas turbine is operating under low load, the staging method is used, in which some of the plurality of main nozzles provided in the gas turbine are stopped and the rest of the main nozzles and the pilot nozzle are used to perform combustion, thus achieving a reduction in nitrogen oxide to be exhausted from the gas turbine.

Therefore, in the present invention, when the gas turbine is operated by the staging method, cooled sweep fluid is supplied to the fuel/sweep-fluid supply channels of some of the main nozzles. Thus, even when some of the main nozzles are stopped, it is possible to prevent self-ignition of the gaseous fuel remaining in the fuel/sweep-fluid supply channels of the stopped main nozzles and to prevent burnout of the main nozzles. Therefore, the soundness of the gas turbine can be maintained.

Furthermore, a gas-turbine plant according to a second aspect of the present invention includes one of the above-described gas turbines.

A gas turbine capable of suppressing the occurrence of damage is used. Therefore, sound operation of the gas-turbine plant can be maintained.

Furthermore, the gas-turbine plant of the second aspect of the present invention may further include a gas-turbine outer case that encloses the gas turbine.

In the gas-turbine plant, the sweep-fluid cooling means is provided close to the suction ports for the ventilation fans provided on the gas-turbine outer case, which encloses the gas turbine. Thus, air suctioned into the ventilation fans can be brought into positive contact with the sweep-fluid cooling means. Thus, heat release of the sweep fluid guided to the sweep-fluid supply channel can be promoted, thus preventing self-ignition of the fuel remaining in the fuel/sweep-fluid supply channels and preventing burnout of the gas-turbine fuel nozzle.

Advantageous Effects of Invention

The sweep fluid cooled to a temperature lower than the self-ignition temperature of the fuel by the sweep-fluid cooling means is guided from the sweep-fluid supply channel to the fuel/sweep-fluid supply channels of the gas-turbine fuel nozzle. Thus, it is possible to prevent self-ignition of the fuel remaining in the fuel/sweep-fluid supply channels and to prevent burnout of the gas-turbine fuel nozzle. Therefore, the soundness of the gas turbine can be maintained.

DESCRIPTION OF EMBODIMENTS

First Embodiment

A first embodiment of the present invention will be described below with reference to FIGS. 1 to 4.

Figure 1:
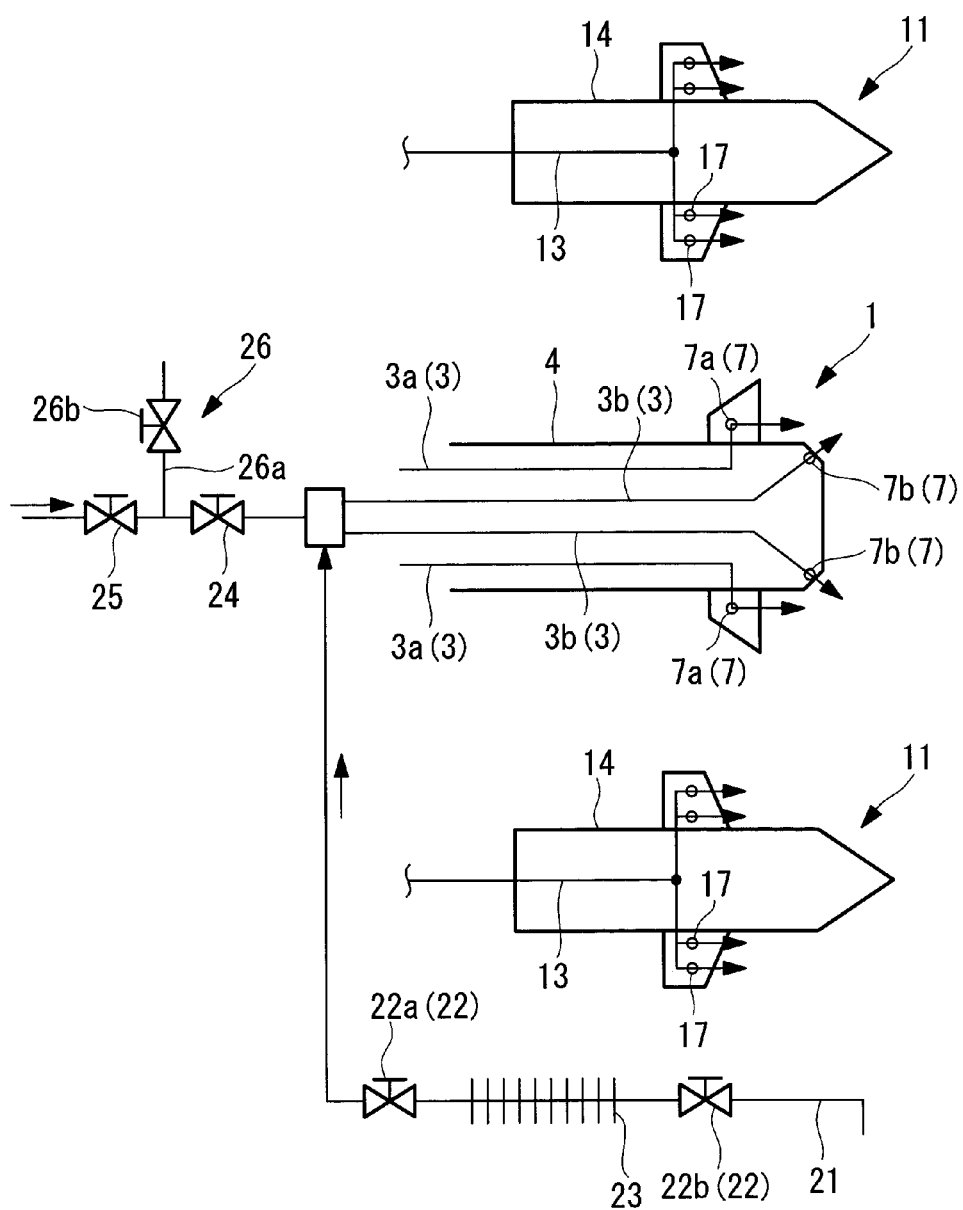
FIG. 1 is a diagram showing, in outline, the structure of a gas turbine having sweep-fluid cooling means, according to a first embodiment of the present invention.

FIG. 1 is a diagram showing, in outline, the structure of a gas turbine having sweep-fluid cooling means, according to this embodiment.

The gas turbine (not shown) provided in a gas turbine combined plant (gas-turbine plant) uses fuel gas (gaseous fuel) as fuel. The gas turbine has a compressor, a combustor, and a turbine, which are not shown. In this gas turbine combined plant, the gas turbine is used in a topping cycle, and a heat recovery steam generator (HRSG) (not shown) and a steam turbine (not shown) that is driven by steam generated by the heat recovery steam generator are used in a bottoming cycle.

The combustor provided in the gas turbine is provided with a pilot nozzle (gas-turbine fuel nozzle) 1 and a plurality of main nozzles 11 that are disposed around the pilot nozzle 1.

The pilot nozzle 1 is used to supply fuel gas (fuel) to an airflow in the combustor. The pilot nozzle 1 has a plurality of pilot-nozzle fuel supply pipes 3, a pilot-nozzle main body 4 that includes the plurality of pilot-nozzle fuel supply pipes 3, and pilot-nozzle injection holes (injection holes) 7 that are formed at downstream end portions of the pilot-nozzle main body 4.

The pilot-nozzle main body 4 is disposed along the direction in which air flows in the combustor. The plurality of pilot-nozzle fuel supply pipes 3 included in the pilot-nozzle main body 4 are composed of premixed-fuel supply pipes (fuel supply channels) 3a that are used in a premix method and diffusion fuel supply pipes (fuel/sweep-fluid supply channels) 3b that are used in a diffusion method.

Fuel gas (hereinafter, referred to as "premixed pilot fuel gas") is supplied to the premixed-fuel supply pipes 3a while the gas turbine is operating under low load and high load. Fuel gas (hereinafter, referred to as "diffusion pilot fuel gas") or air (sweep fluid) for sweeping the diffusion pilot fuel gas is supplied to the diffusion fuel supply pipes 3b. The diffusion pilot fuel gas is supplied to the diffusion fuel supply pipes 3b while the gas turbine is operating under low load, and sweep air (sweep fluid), to be described later, is supplied thereto while the gas turbine is operating under high load.

The plurality of pilot-nozzle injection holes (injection holes) 7, for injecting the premixed pilot fuel gas or the diffusion pilot fuel gas guided from the premixed-fuel supply pipes 3a or the diffusion fuel supply pipes 3b, are provided at downstream ends of the premixed-fuel supply pipes 3a or the diffusion fuel supply pipes 3b. Pilot-nozzle injection holes 7a that communicate with the premixed-fuel supply pipes 3a are provided closer to the upstream side of the airflow in the combustor than pilot-nozzle injection holes 7b that communicate with the diffusion fuel supply pipes 3b are.

While the gas turbine is operating under low load, the pilot nozzle 1 injects the diffusion pilot fuel gas from the diffusion fuel supply pipes 3b and the premixed pilot fuel gas from the premixed-fuel supply pipes 3a into the combustor, for combustion. While the gas turbine is operating under high load, only the premixed pilot fuel gas is injected from the premixed-fuel supply pipes 3a into the combustor, for combustion. A flame generated by combusting such fuel injected from the pilot nozzle 1 is used as a pilot burner for combustion with the main nozzles 11.

The main nozzles 11 are used to supply main fuel gas, serving as fuel gas, to the airflow in the combustor. The main nozzles 11 each have a main-nozzle fuel supply pipe 13, a main-nozzle main body 14 that includes the main-nozzle fuel supply pipe 13, and main-nozzle injection holes 17 that are formed at a downstream side of the main-nozzle main body 14.

The main-nozzle main body 14 is disposed along the direction in which air flows in the combustor. The main-nozzle fuel supply pipe 13 included in the main-nozzle main body 14 is used to supply the main fuel gas used in the premix method.

The downstream end of the main-nozzle fuel supply pipe 13 is branched into a plurality of pipes where the plurality of main-nozzle injection holes 17 for injecting the main fuel gas guided from the main-nozzle fuel supply pipe 13 are provided. The main-nozzle injection holes 17 that communicate with the pipes branched from the main-nozzle fuel supply pipe 13 are provided closer to the upstream side of the airflow in the combustor than the pilot-nozzle injection holes 7a and 7b provided in the pilot nozzle 1 are. The main fuel gas injected into the airflow from the main-nozzle fuel supply pipe 13 is combusted by using the flame generated with the pilot nozzle 1 as a pilot burner.

A sweep-air supply pipe (sweep-fluid supply channel) 21 that guides, as sweep air, high-temperature air (for example, about 500° C.) extracted from a casing (not shown) of the gas turbine is connected to the diffusion fuel supply pipes 3b. The sweep-air supply pipe 21 is provided with two on-off valves 22. Between the two on-off valves 22a and 22b, a plurality of projections (sweep-fluid cooling means) 23 are provided around the sweep-air supply pipe 21.

Figure 2:
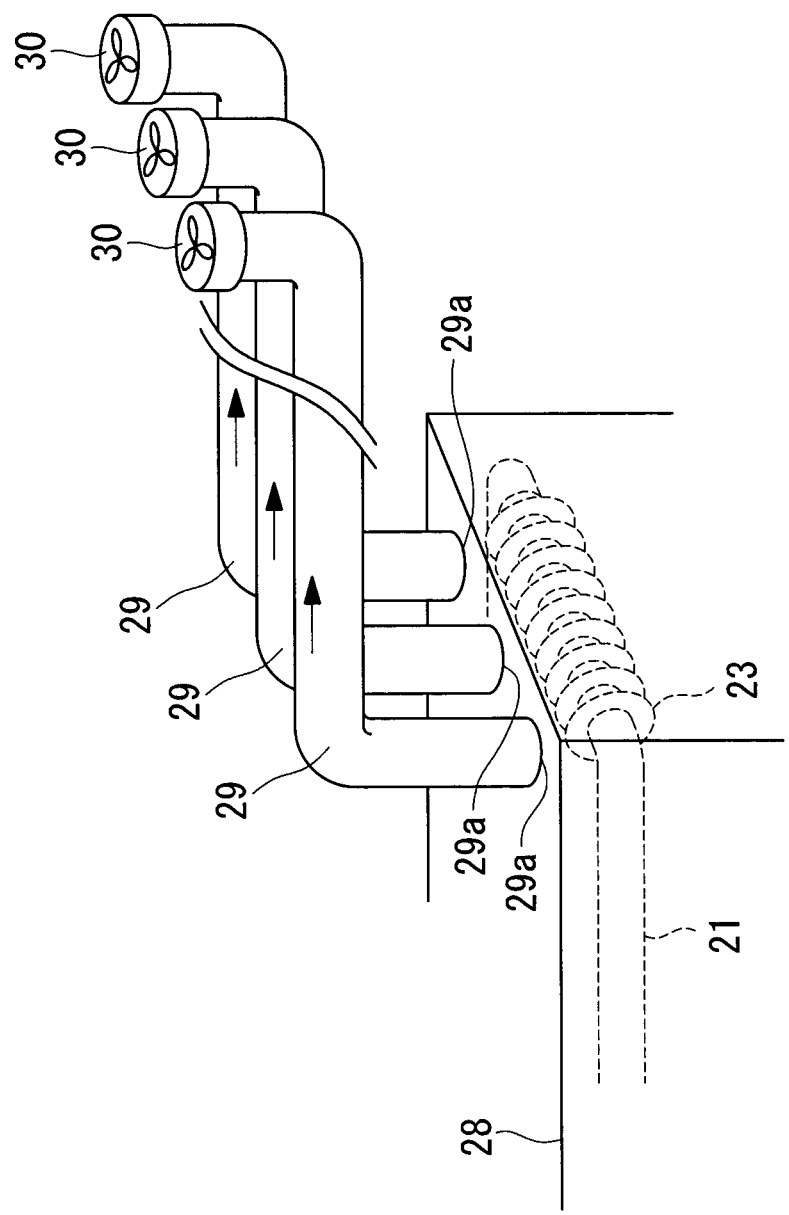
FIG. 2 is a partially-enlarged arrangement view showing the arrangement of the sweep-fluid cooling means provided close to suction ports for ventilation fans provided on a gas-turbine enclosure that encloses the gas turbine shown in FIG. 1.

As shown in FIG. 2, cooling fins are preferably used as a specific example of the projections 23. The plurality of cooling fins (projections) 23, provided around the sweep-air supply pipe 21, release the heat of the high-temperature sweep air guided to the sweep-air supply pipe 21. The high-temperature sweep air passing through the sweep-air supply pipe 21 is cooled with the cooling fins 23.

More specifically, when the high-temperature (about 500° C.) sweep air extracted from the casing of the gas turbine passes through the sweep-air supply pipe 21, the sweep air is cooled to about 440° C. through heat release from the plurality of cooling fins 23, provided around the sweep-air supply pipe 21. The temperature of about 440° C. is an example value lower than the self-ignition temperature of methane (about 445° C.), which is a major component of the diffusion pilot fuel gas remaining in the diffusion fuel supply pipes 3b (see FIG. 1).

A fuel-flow-rate control valve 24 that controls the flow rate of the diffusion pilot fuel gas to be supplied to the diffusion fuel supply pipes 3b; a fuel-pressure control valve 25 that controls the pressure of the diffusion pilot fuel gas; and atmospheric discharge means 26 that is provided at a portion between the fuel-flow-rate control valve 24 and the fuel-pressure control valve 25 and that discharges, to the atmosphere, the sweep air guided to the portion between the fuel-flow-rate control valve 24 and the fuel-pressure control valve 25 from the diffusion fuel supply pipes 3b are provided on the upstream side of the diffusion fuel supply pipes 3b.

The fuel-pressure control valve 25 is provided closer to the upstream side than the fuel-flow-rate control valve 24 is. The degrees-of-opening of the fuel-pressure control valve 25 and the fuel-flow-rate control valve 24 are controlled according to the loading state of the gas turbine.

The atmospheric discharge means 26 includes an atmospheric discharge pipe 26a that is connected to the portion between the fuel-pressure control valve 25 and the fuel-flow-rate control valve 24 in such a manner as to be branched therefrom and a vent valve 26b that is provided in the atmospheric discharge pipe 26a. By opening and closing the vent valve 26b, the portion between the fuel-pressure control valve 25 and the fuel-flow-rate control valve 24 can be made to communicate with the atmosphere via the atmospheric discharge pipe 26a.

FIG. 2 is a partially-enlarged arrangement view showing the arrangement of the sweep-fluid cooling means provided close to suction ports in a gas-turbine enclosure 28 that encloses the gas turbine.

The circumference of the gas turbine is enclosed by the gas-turbine enclosure (gas-turbine outer case) 28. The gas-turbine enclosure 28 encloses the circumferences of the casing of the turbine, the compressor, and the combustor. With this structure, noise generated from the gas turbine is prevented from spreading to the surrounding area.

The gas-turbine enclosure 28 is provided with ventilation fans 30 connected via ventilating pipes 29 in order to suppress an increase in the temperature in the gas-turbine enclosure 28.

The plurality of ventilating pipes 29 that guide air in the gas-turbine enclosure 28 to the ventilation fans 30 are provided between the gas-turbine enclosure 28 and the ventilation fans 30. The ventilating pipes 29 are connected, for example, to an upper portion of the gas-turbine enclosure 28. Suction ports 29a that are provided for the ventilation fans 30 and that guide air in the gas-turbine enclosure 28 to the ventilating pipes 29 are formed in the upper portion of the gas-turbine enclosure 28.

The sweep-air supply pipe 21 is disposed in the gas-turbine enclosure 28 along the upper portion of the gas-turbine enclosure 28, and the plurality of cooling fins 23, provided around the sweep-air supply pipe 21, are disposed close to the suction ports 29a.

Specifically, the cooling fins 23 are arranged such that at least one of them has a shortest distance of 10 cm or less to any of the suction ports 29a. With this arrangement, air to be suctioned into the ventilation fans 30 can be brought into positive contact with the cooling fins 23, provided around the sweep-air supply pipe 21.

Next, a sweep action performed in the gas turbine of this embodiment will be described by using a valve timing chart shown in FIG. 3 and a flowchart shown in FIG. 4.

Figure 3:
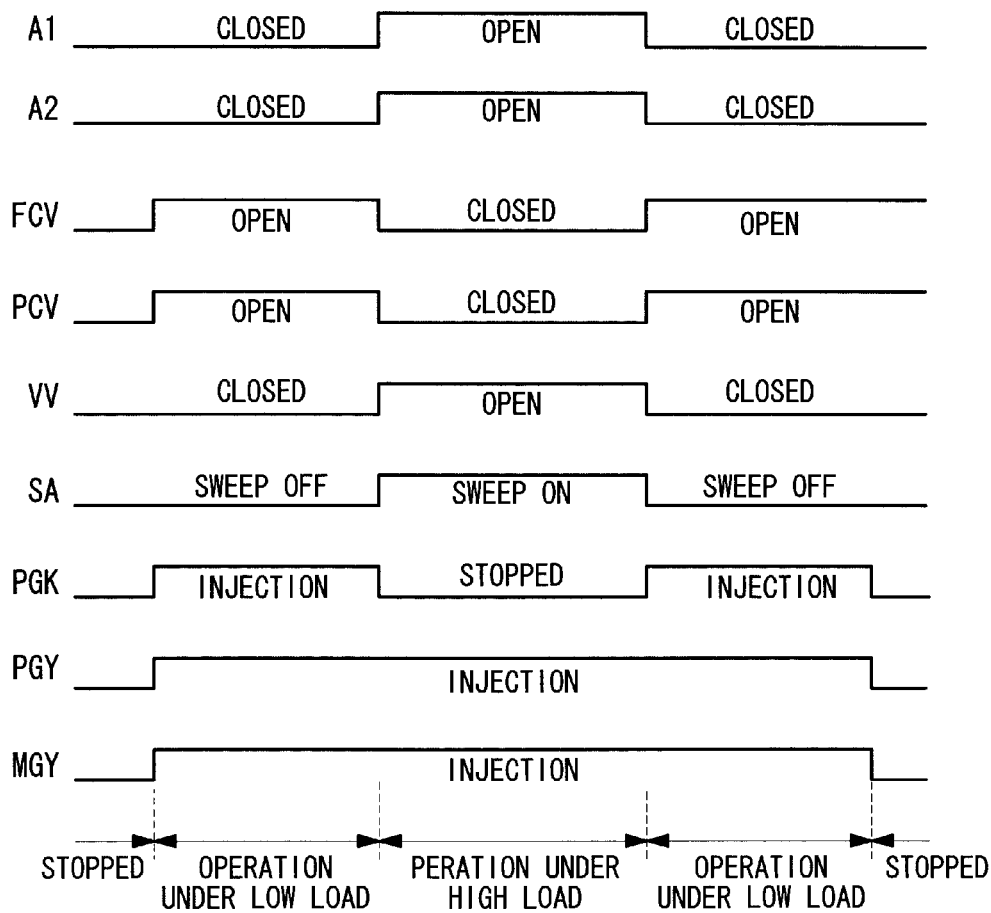
FIG. 3 is a valve timing chart for the gas turbine shown in FIG. 1.

FIG. 3 is the valve timing chart for the gas turbine shown in FIG. 1.

In the valve timing chart of FIG. 3, A1 indicates an open/closed state of the on-off valve 22a, provided in the sweep-air supply pipe 21; A2 indicates an open/closed state of the on-off valve 22b; FCV indicates an open/closed state of the fuel-flow-rate control valve 24, provided on the upstream side of the diffusion fuel supply pipes 3b; PCV indicates an open/closed state of the fuel-pressure control valve 25; VV indicates an open/closed state of the vent valve 26b, provided in the atmospheric discharge pipe 26a; SA indicates an on/off state of the sweep action; PGK indicates an injection state of the diffusion pilot fuel gas injected from the diffusion fuel supply pipes 3b according to the loading state of the gas turbine; PGY indicates an injection state of the premixed pilot fuel gas injected from the premixed-fuel supply pipes 3a according to the loading state of the gas turbine; and MGY indicates an injection state of the main fuel gas injected from the main nozzles 11.

When the operation of the gas turbine is stopped, the on-off valves 22a and 22b, which are provided in the sweep-air supply pipe 21, and the fuel-pressure control valve 25, the fuel-flow-rate control valve 24, and the vent valve 26b, which are provided on the upstream side of the diffusion fuel supply pipes 3b, are completely closed, and injection of the diffusion pilot fuel gas, which is injected from the diffusion fuel supply pipes 3b, the premixed pilot fuel gas, which is injected from the premixed-fuel supply pipes 3a, and the main fuel gas, which is injected from the main nozzles 11, is stopped.

When the gas turbine is operating under low load, the fuel-pressure control valve 25 and the fuel-flow-rate control valve 24 are opened, and the on-off valves 22a and 22b and the vent valve 26b remain in the completely closed state. Since the fuel-pressure control valve 25 and the fuel-flow-rate control valve 24 are opened, the diffusion pilot fuel gas is supplied to the diffusion fuel supply pipes 3b.

The diffusion pilot fuel gas supplied to the diffusion fuel supply pipes 3b is injected from the pilot-nozzle injection holes 7b, which communicate with the diffusion fuel supply pipes 3b, into the airflow in the combustor, for combustion. Furthermore, the premixed pilot fuel gas is supplied to the premixed-fuel supply pipes 3a, is injected from the pilot-nozzle injection holes 7a, which communicate with the premixed-fuel supply pipes 3a, into the airflow in the combustor, for combustion. The main fuel gas is injected from the main nozzles 11 and is combusted by using, as a pilot burner, a flame generated with the diffusion pilot fuel gas and the premixed pilot fuel gas, supplied from the diffusion fuel supply pipes 3b and the premixed-fuel supply pipes 3a, respectively.

Note that injection of the premixed pilot fuel gas and the diffusion pilot fuel gas is not necessarily performed at about the same time; for example, injection of the premixed pilot fuel gas may be performed after injection of the diffusion pilot fuel gas.

When the gas turbine is operating under high load, the on-off valves 22a and 22b and the vent valve 26b are opened. Since the on-off valves 22a and 22b are completely opened, sweep air extracted from the casing of the gas turbine and guided to the sweep-air supply pipe 21 is guided to the diffusion fuel supply pipes 3b, thus starting (setting to on) the sweep of the diffusion fuel supply pipes 3b. Furthermore, the fuel-pressure control valve 25 and the fuel-flow-rate control valve 24 are completely closed. Thus, injection of the diffusion pilot fuel gas from the diffusion fuel supply pipes 3b is stopped.

At this time, when the high-temperature (about 500° C.) sweep air extracted from the casing of the gas turbine passes through the sweep-air supply pipe 21, the sweep air is cooled to about 440° C. through heat release from the plurality of cooling fins 23, provided around the sweep-air supply pipe 21. The temperature of about 440° C. is an example value lower than the self-ignition temperature of methane (about 445° C.), which is a major component of the diffusion pilot fuel gas remaining in the diffusion fuel supply pipes 3b.

The cooled sweep air guided from the sweep-air supply pipe 21 to the diffusion fuel supply pipes 3b is guided from the diffusion fuel supply pipes 3b to the pilot-nozzle injection holes 7b. Since the cooled sweep air is guided to the diffusion fuel supply pipes 3b, it is possible to prevent self-ignition of the remaining diffusion pilot fuel gas and to prevent a flame or high-temperature combustion gas in the combustor from flowing back from the pilot-nozzle injection holes 7b to the diffusion fuel supply pipes 3b.

Furthermore, even if part of the cooled sweep air guided from the sweep-air supply pipe 21 to the diffusion fuel supply pipes 3b flows into the portion between the fuel-pressure control valve 25 and the fuel-flow-rate control valve 24, since the vent valve 26b, provided in the atmospheric discharge pipe 26a, is opened, the sweep air flowing into the diffusion fuel supply pipes 3b can be discharged to the atmosphere. Thus, even if part of the sweep air guided from the diffusion fuel supply pipes 3b is mixed into the fuel gas accumulated in the portion between the fuel-pressure control valve 25 and the fuel-flow-rate control valve 24, the occurrence of an explosion of the fuel gas can be suppressed.

When the gas turbine shifts from a high load operation to a low load operation, the fuel-pressure control valve 25 and the fuel-flow-rate control valve 24 are opened, and the on-off valves 22a and 22b and the vent valve 26b are completely closed. Thus, the sweep action is stopped (set to off), and the diffusion pilot fuel gas is supplied to the diffusion fuel supply pipes 3b and is injected into the combustor.

Note that, while the gas turbine is operating under both of low load and high load, injection of the premixed pilot fuel gas and the main fuel gas is continued.

The flowchart of the sweep action in the valve timing chart shown in FIG. 3 will be described with reference to FIG. 4.

The sweep operation action for the diffusion fuel supply pipes 3b is started (Step S1). When the sweep operation action is started, it is determined whether the gas turbine is operating under high load or low load (Step S2). If it is determined in Step S2 that the gas turbine is operating under high load, the injection state of the diffusion pilot fuel gas injected from the diffusion fuel supply pipes 3b is set to off, the injection state of the premixed pilot fuel gas injected from the premixed-fuel supply pipes 3a is set to on, and the injection state of the main fuel gas injected from the main nozzles 11 is set to on (Step S3).

After the injection states of the diffusion pilot fuel gas, the premixed pilot fuel gas, and the main fuel gas are set in Step S3, the vent valve 26b, provided in the atmospheric discharge pipe 26a, is opened (Step S4). Thereafter, the on-off valves 22a and 22b, provided in the sweep-air supply pipe 21, are opened, thus guiding the cooled sweep air to the diffusion fuel supply pipes 3b. Thus, the sweep action for the diffusion fuel supply pipes 3b is started (set to on) (Step S5).

If it is determined in Step S2 that the gas turbine is operating under low load, the injection state of the diffusion pilot fuel gas injected from the diffusion fuel supply pipes 3b is set to on, the injection state of the premixed pilot fuel gas injected from the premixed-fuel supply pipes 3a is set to on, and the injection state of the main fuel gas injected from the main nozzles 11 is set to on (Step S6), and the sweep operation action ends without sweeping the diffusion fuel supply pipes 3b (Step S7).

As described above, according to the gas turbine of this embodiment and the gas turbine combined plant having the same, the following advantages are afforded.

The sweep air (sweep fluid) is guided from the sweep-air supply pipe (sweep-fluid supply channel) 21 to the diffusion fuel supply pipes (fuel/sweep-fluid supply channels) 3b of the pilot nozzle (gas-turbine fuel nozzle) 1. The sweep air is guided after being cooled by the sweep-fluid cooling means 23 to a temperature lower than the self-ignition temperature of methane, which is a major component of the diffusion pilot fuel gas (fuel). Thus, it is possible to prevent self-ignition of the diffusion pilot fuel gas remaining in the diffusion fuel supply pipes 3b and to prevent burnout of the pilot nozzle 1. Therefore, the soundness of the gas turbine can be maintained.

The plurality of cooling fins (projections) 23 are provided as the sweep-fluid cooling means. Thus, the sweep air guided from the casing, whose maximum temperature reaches about 500° C. during the operation of the gas turbine, to the sweep-air supply pipe 21 can be cooled through heat release from the plurality of cooling fins 23, provided around the sweep-air supply pipe 21. Therefore, the temperature of the sweep air guided from the sweep-air supply pipe 21 to the diffusion fuel supply pipes 3b can be cooled to about 440° C., which is lower than the self-ignition temperature of the diffusion pilot fuel gas (about 445° C.).

The plurality of cooling fins 23 provided around the sweep-air supply pipe 21 are disposed close to the suction ports 29a for the ventilation fans 30 provided on the gas-turbine enclosure (gas-turbine outer case) 28, which encloses the gas turbine. Thus, air to be suctioned into the ventilation fans 30 can be brought into positive contact with the plurality of cooling fins 23 provided around the sweep-air supply pipe 21. Therefore, it is possible to promote heat release of the sweep air guided to the sweep-air supply pipe 21.

The atmospheric discharge means 26 is provided at the portion between the fuel-pressure control valve 25, which is provided on the upstream side of the diffusion fuel supply pipes 3b and controls the pressure of the diffusion pilot fuel gas to be guided to the diffusion fuel supply pipes 3b, and the fuel-flow-rate control valve 24, which is provided on the upstream side of the diffusion fuel supply pipes 3b and controls the flow rate of the diffusion pilot fuel gas, to discharge, to the atmosphere, the sweep air that has been guided to the portion between the fuel-flow-rate control valve 24 and the fuel-pressure control valve 25. Thus, even if the sweep air guided from the diffusion fuel supply pipes 3b flows into the portion between the fuel-flow-rate control valve 24 and the fuel-pressure control valve 25, the sweep air can be discharged to the atmosphere by the atmospheric discharge means 26. Therefore, it is possible to prevent a situation in which the sweep air is mixed into the diffusion pilot fuel gas existing in the portion between the fuel-flow-rate control valve 24 and the fuel-pressure control valve 25 to cause an explosion.

A gas turbine capable of suppressing the occurrence of burnout of the pilot nozzle 1 is used. Therefore, sound operation of the gas turbine combined plant (gas-turbine plant) can be maintained.

Second Embodiment

This embodiment differs from the first embodiment in that air compressors are used as the sweep-fluid cooling means and is the same in the other points. Therefore, identical reference symbols are assigned to the same structures as those of the first embodiment, and a description thereof will be omitted.

Figure 5:
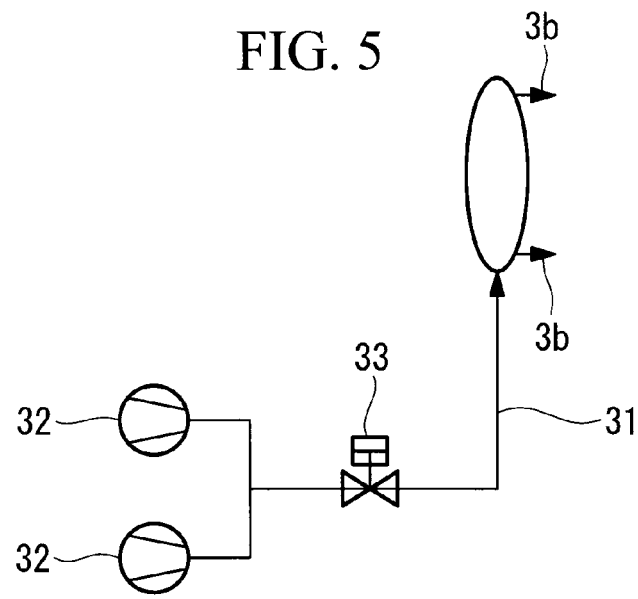
FIG. 5 is a diagram showing, in outline, the structure of sweep-fluid cooling means for sweep air guided to a gas turbine according to a second embodiment of the present invention.

FIG. 5 is a diagram showing, in outline, the structure of sweep-fluid cooling means for sweep air guided to a gas turbine according to this embodiment.

As the sweep-fluid cooling means, external air compressors (compressors) 32, which are provided separately, are used to supply, as sweep air, compressed air (sweep fluid) to a sweep-air supply pipe (sweep-fluid supply channel) 31 that is connected to the diffusion fuel supply pipes (fuel/sweep-fluid supply channels) 3b. The sweep-air supply pipe 31 connects the diffusion fuel supply pipes 3b and the air compressors 32. The sweep-air supply pipe 31 is provided with an on-off valve 33 that supplies and shuts off the sweep air supplied from the air compressors 32 to the diffusion fuel supply pipes 3b.

The air compressors 32 compress suctioned atmosphere and discharge it to the sweep-air supply pipe 31 as sweep air, and, for example, the two air compressors 32 are provided. The sweep air discharged from the air compressors 32 is guided to the diffusion fuel supply pipes 3b. The temperature of the sweep air is about 60° C. at most, and this is sufficiently lower than the self-ignition temperature of methane, which is a major component of the diffusion pilot fuel gas.

As described above, according to the gas turbine of this embodiment and a gas turbine combined plant having the same, the following advantages are afforded.

The air compressors 32 are used as the sweep-fluid cooling means. Thus, air (about 60° C.) supplied from the air compressors 32 can be guided to the diffusion fuel supply pipes (fuel/sweep-fluid supply channels) 3b as sweep air (sweep fluid). Therefore, it is possible to guide sweep air having a temperature lower than the self-ignition temperature of methane (about 445° C.), which is a major component of the diffusion pilot fuel gas (fuel), to the diffusion fuel supply pipes 3b.

Third Embodiment

This embodiment differs from the first embodiment in that an air compressor and a TCA cooler are used as the sweep-fluid cooling means and is the same in the other points. Therefore, identical reference symbols are assigned to the same structures as those of the first embodiment, and a description thereof will be omitted.

Figure 6:
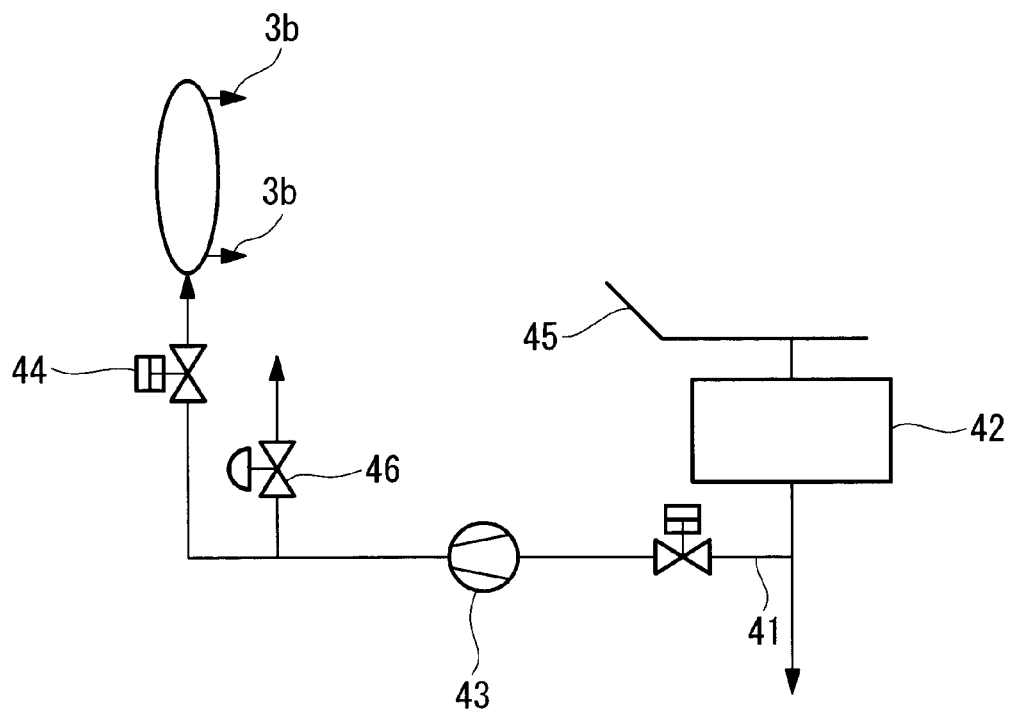
FIG. 6 is a diagram showing, in outline, the structure of sweep-fluid cooling means for sweep air guided to a gas turbine according to a third embodiment of the present invention.

FIG. 6 is a diagram showing, in outline, the structure of the sweep-fluid d cooling means for sweep air guided to a gas turbine according to this embodiment.

The sweep-fluid cooling means includes a TCA cooler (gas turbine cooling-air cooler) 42 that is provided in a sweep-air supply pipe (sweep-fluid supply channel) 41 and that performs heat exchange between air (cooling medium) and sweep air (sweep fluid) extracted from a casing 45 of the gas turbine; and an air compressor 43 that compresses the sweep air cooled in the TCA cooler 42. An on-off valve 44 that supplies and shuts off the sweep air to the diffusion fuel supply pipes (fuel/sweep-fluid supply channels) 3b is provided on a downstream side of the air compressor 43, provided in the sweep-air supply pipe 41.

The TCA cooler 42 (heat-exchange means) performs heat exchange between air having a high temperature (about 500° C.) extracted from the casing 45 and air serving as a cooling medium. Thus, the air at about 500° C. extracted from the casing 45 is cooled to about 200° C., for example, and is taken out from the TCA cooler 42. Part of the extracted air cooled to about 200° C. through the heat exchange with the air in the TCA cooler 42 is guided, as sweep air, from the sweep-air supply pipe 41 to the air compressor 43. Furthermore, the rest of the extracted air is used to cool a turbine shaft (not shown) and turbine blades (not shown) of the gas turbine.

The air compressor 43 supplies the sweep air cooled to about 200° C. in the TCA cooler 42 to the sweep-air supply pipe 41 on the downstream side of the air compressor 43. The single air compressor 43 is provided, for example. The sweep air supplied by the air compressor 43 passes through a drain separator (not shown), thereby removing a drain flow included in the sweep air. The drain flow removed from the sweep air is discharged from a drain valve 46 that is provided in the sweep-air supply pipe 41, to the outside of the sweep-air supply pipe 41.

As described above, according to the gas turbine of this embodiment and a gas turbine combined plant having the same, the following advantages are afforded.

By using the TCA cooler (heat-exchange means, gas-turbine cooling-air cooler) 42 as the sweep-fluid cooling means, air having a high temperature (for example, about 500° C.) extracted from the casing 45 of the gas turbine is subjected to heat exchange with air (cooling medium). Thus, air (at about 200° C.) cooled by the TCA cooler 42 can be guided, as sweep air (sweep fluid), from the sweep-air supply pipe (sweep-fluid supply channel) 41 to the diffusion fuel supply pipes (fuel/sweep-fluid supply channels) 3b. Therefore, the temperature of sweep air to be guided to the diffusion fuel supply pipes 3b can be reduced to about 400° C., which is lower than the self-ignition temperature of methane (about 445° C.), which is a major component of the diffusion pilot fuel gas (fuel).

Part of the air (fluid) cooled by the TCA cooler 42 is used as sweep air. Thus, it is not necessary to separately provide heat-exchange means for cooling sweep air. Therefore, the facility costs can be reduced.

Note that, in this embodiment, a description has been given of a case where the sweep air taken out from the TCA cooler 42 is supplied to the sweep-air supply pipe 41 on the downstream side of the air compressor 43 via the air compressor 43; however, the present invention is not limited thereto, and the air compressor 43 may be omitted.

Furthermore, a description has been given of a case where air is used as a cooling medium in the TCA cooler 42; however, the present invention is not limited thereto, and steam that is guided from the heat recovery steam generator provided in the gas turbine combined plant may be used.

Fourth Embodiment

This embodiment differs from the first embodiment in that main nozzles and a pilot nozzle are dual-type nozzles that each inject fuel oil or fuel gas and is the same in the other points. Therefore, identical reference symbols are assigned to the same structures as those of the first embodiment, and a description thereof will be omitted.

Figure 7:
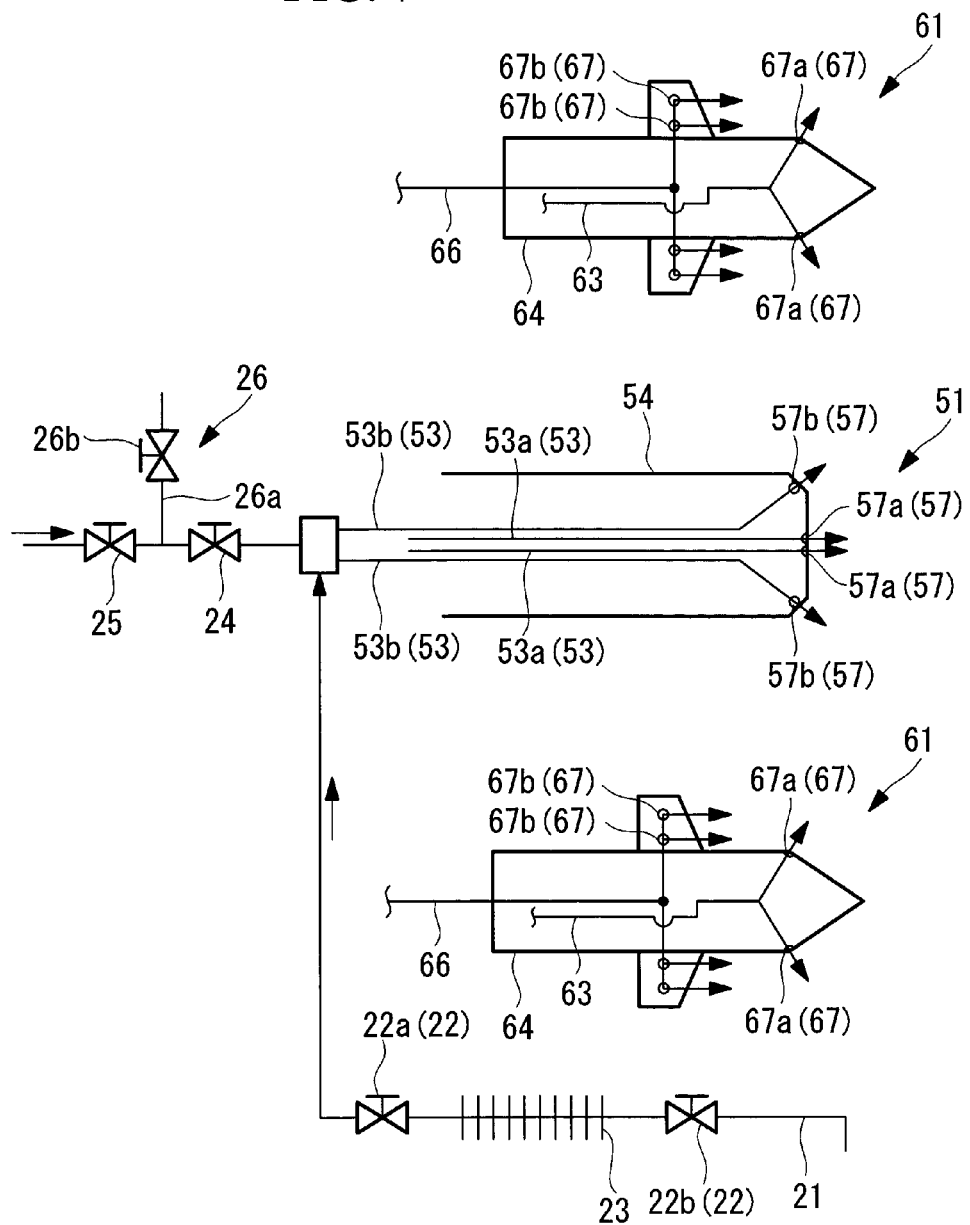
FIG. 7 is a diagram showing, in outline, the structure of a gas turbine having sweep-fluid cooling means, according to a fourth embodiment of the present invention.

FIG. 7 is a diagram showing, in outline, the structure of a gas turbine having sweep-fluid cooling means, according to this embodiment.

A pilot nozzle (gas-turbine fuel nozzle) 51 is a dual-fuel firing pilot nozzle that selectively supplies fuel oil (liquid fuel) and fuel gas (gaseous fuel) to the airflow in the combustor. The pilot nozzle 51 has pilot-nozzle fuel supply pipes 53, a pilot-nozzle main body 54 that includes the plurality of pilot-nozzle fuel supply pipes 53, and pilot-nozzle injection holes (injection holes) 57 that are formed at downstream end portions of the pilot-nozzle main body 54.

The pilot-nozzle main body 54 is disposed along the direction in which air flows in the combustor. The pilot-nozzle fuel supply pipes 53 included in the pilot-nozzle main body 54 supply fuel that is used in the diffusion method. The pilot-nozzle fuel supply pipes 53 have diffusion fuel oil supply pipes (fuel supply channels) 53a that supply fuel oil (hereinafter, referred to as "diffusion pilot fuel oil") during an oil-firing operation of the gas turbine; and diffusion fuel gas supply pipes (fuel/sweep-fluid supply channels) 53b that supply fuel gas (hereinafter, referred to as "diffusion pilot fuel gas") during a gas-firing operation of the gas turbine and that supply sweep air (sweep fluid) during the oil-firing operation of the gas turbine.

The plurality of pilot-nozzle injection holes 57, for injecting diffusion pilot fuel oil or diffusion pilot fuel gas guided from the diffusion fuel oil supply pipes 53a or the diffusion fuel gas supply pipes 53b, are provided at downstream ends of the diffusion fuel oil supply pipes 53a or the diffusion fuel gas supply pipes 53b. Pilot-nozzle injection holes 57b that communicate with the diffusion fuel gas supply pipes 53b are provided closer to the downstream side of the airflow in the combustor than pilot-nozzle injection holes 57a that communicate with the diffusion fuel oil supply pipes 53a are.

During the gas-firing operation of the gas turbine, the pilot nozzle 51 injects the diffusion pilot fuel gas from the diffusion fuel gas supply pipes 53b into the combustor, for combustion. When the gas turbine is in the oil-firing operation, the pilot nozzle 51 injects the diffusion pilot fuel oil from the diffusion fuel oil supply pipes 53a into the combustor, for combustion.

Main nozzles 61 are used to supply, to the airflow in the combustor, main fuel oil, which is liquid fuel, or main fuel gas, which is gaseous fuel. The main nozzles 61 each have a main-nozzle fuel-gas supply pipe 66, a main-nozzle main body 64 that includes a main-nozzle fuel-oil supply pipe 63 and the main-nozzle fuel-gas supply pipe 66, the main-nozzle fuel-oil supply pipe 63, and main-nozzle injection holes 67 that are formed at downstream end portions of the main-nozzle main body 64.

The main-nozzle main body 64 is disposed along the direction in which air flows in the combustor. The main-nozzle fuel-oil supply pipe 63, included in the main-nozzle main body 64, is used to supply the main fuel oil by the premix method during the oil-firing operation. Furthermore, the main-nozzle fuel-gas supply pipe 66, included in the main-nozzle main body 64, is used to supply the main fuel gas by the premix method during the gas-firing operation.

The downstream end of the main-nozzle fuel-oil supply pipe 63 is branched to communicate with two main-nozzle injection holes 67a, and the main fuel oil is supplied therethrough to the airflow. The downstream end of the main-nozzle fuel-gas supply pipe 66 is branched to communicate with a plurality of main-nozzle injection holes 67b, and the main fuel gas is supplied therethrough.

Next, a sweep action performed in the gas turbine of this embodiment will be described by using a valve timing chart shown in FIG. 8 and a flowchart shown in FIG. 9.

Figure 8:
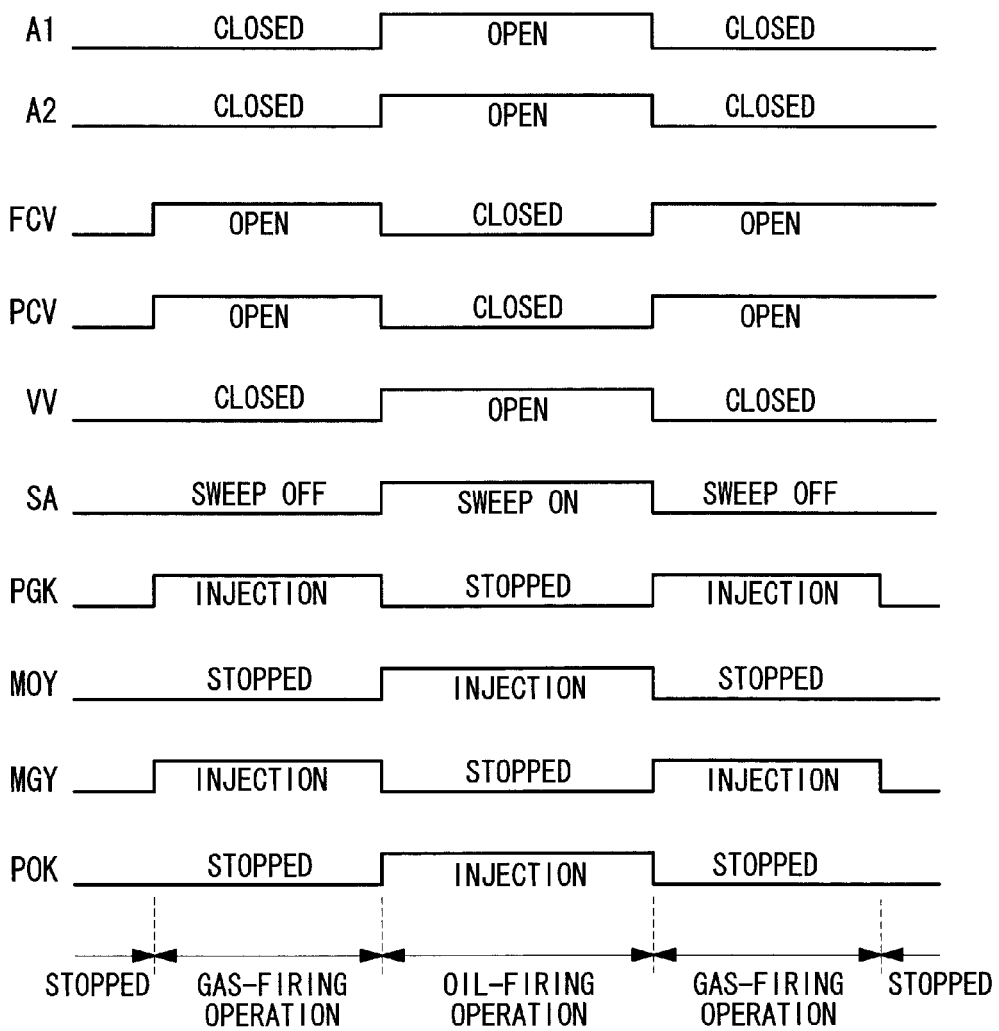
FIG. 8 is a valve timing chart for the gas turbine shown in FIG. 7.
Figure 9:
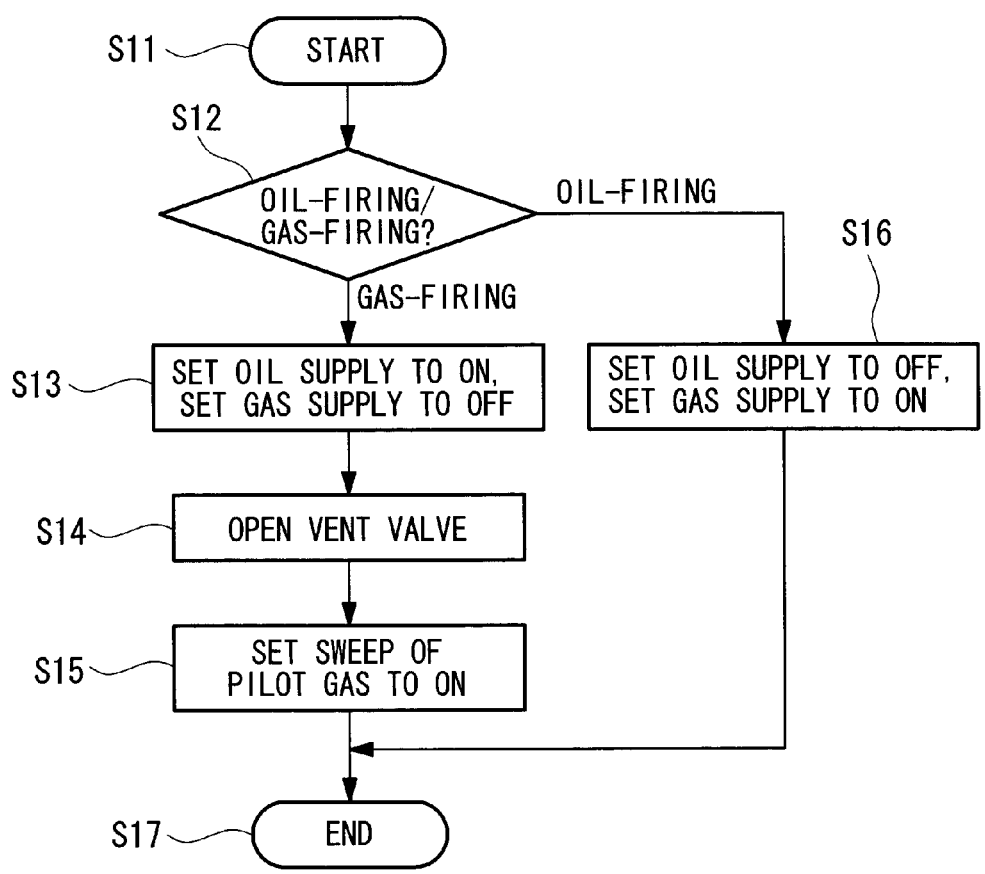
FIG. 9 is a flowchart of a sweep action performed in the gas turbine shown in FIG. 7.

FIG. 8 is the valve timing chart for the gas turbine shown in FIG. 7.

In the valve timing chart of FIG. 8, A1 indicates an open/closed state of the on-off valve 22a, provided in the sweep-air supply pipe (sweep-fluid supply channel) 21; A2 indicates an open/closed state of the on-off valve 22b; FCV indicates an open/closed state of the fuel-flow-rate control valve 24, provided on the upstream side of the diffusion fuel supply pipes 53b; PCV indicates an open/closed state of the fuel-pressure control valve 25; VV indicates an open/closed state of the vent valve 26b, provided in the atmospheric discharge pipe 26a; SA indicates an on/off state of the sweep action; PGK indicates an injection state of the diffusion pilot fuel gas injected from the diffusion fuel gas supply pipes 53b according to the loading state of the gas turbine; POK indicates an injection state of the diffusion pilot fuel oil injected from the diffusion fuel oil supply pipes 53a according to the loading state of the gas turbine; MGY indicates an injection state of the main fuel gas injected from the main-nozzle fuel-gas supply pipes 66; and MOY indicates an injection state of the main fuel oil injected from the main-nozzle fuel-oil supply pipes 63.

When the operation of the gas turbine is stopped, the on-off valves 22a and 22b, the fuel-pressure control valve 25, the fuel-flow-rate control valve 24, and the vent valve 26b are closed, and injection of the diffusion pilot fuel gas, the diffusion pilot fuel oil, the main fuel gas, and the main fuel oil is stopped.

When the gas turbine is in the gas-firing operation, the fuel-pressure control valve 25 and the fuel-flow-rate control valve 24 are opened, and the on-off valves 22a and 22b and the vent valve 26b are closed. Since the fuel-pressure control valve 25 and the fuel-flow-rate control valve 24 are opened, the diffusion pilot fuel gas is supplied to the diffusion fuel gas supply pipes 53b.

The diffusion pilot fuel gas supplied to the diffusion fuel gas supply pipes 53b is injected from the pilot-nozzle injection holes 57b, which communicate with the diffusion fuel gas supply pipes 53b, into the airflow in the combustor, for combustion. Furthermore, the main fuel gas is supplied to the main-nozzle fuel-gas supply pipes 66 and is combusted by using a flame generated by combusting the diffusion pilot fuel gas, as a pilot burner. Note that injection of the diffusion pilot fuel oil and the main fuel oil is stopped.

When the gas turbine is in the oil-firing operation, the on-off valves 22a and 22b provided in the sweep-air supply pipe 21 and the vent valve 26b are opened. Since the on-off valves 22a and 22b are opened, sweep air extracted from the casing of the gas turbine and guided to the sweep-air supply pipe 21 is guided to the diffusion fuel gas supply pipes 53b, thus starting (setting to on) the sweep of the diffusion fuel gas supply pipes 53b. Furthermore, the fuel-pressure control valve 25 and the fuel-flow-rate control valve 24 are closed. Thus, injection of the diffusion pilot fuel gas from the diffusion fuel gas supply pipes 53b is stopped.

The cooled sweep air (for example, about 400° C.) guided from the sweep-air supply pipe 21 to the diffusion fuel gas supply pipes 53b is guided from the diffusion fuel gas supply pipes 53b to the pilot-nozzle injection holes 57b. Since the cooled sweep air is guided to the diffusion fuel gas supply pipes 53b, it is possible to prevent self-ignition of methane, which is a major component of the remaining diffusion pilot fuel gas, and to prevent a flame or high-temperature combustion gas in the combustor from flowing back from the pilot-nozzle injection holes 57b into the diffusion fuel gas supply pipes 53b. Note that injection of the diffusion pilot fuel gas and the main fuel gas is stopped.

When the gas turbine is in the gas-firing operation, the fuel-pressure control valve 25 and the fuel-flow-rate control valve 24 are opened, and the on-off valves 22a and 22b and the vent valve 26b are closed. Thus, the diffusion pilot fuel gas is supplied to the diffusion fuel gas supply pipes 53b and is injected from the pilot-nozzle injection holes 57b into the combustor. Furthermore, the main fuel gas is supplied to the main-nozzle fuel-gas supply pipes 66 and is injected from the main-nozzle injection holes 67b into the combustor. Note that injection of the diffusion pilot fuel oil and the main fuel oil is stopped.

The flowchart of the sweep action in the valve timing chart shown in FIG. 8 will be described with reference to FIG. 9.

The sweep operation action for the diffusion fuel gas supply pipes 53b is started (Step S11). When the sweep operation action is started, it is determined whether the gas turbine is in the oil-firing operation or the gas-firing operation (Step S12). If it is determined in Step S12 that the gas turbine is in the oil-firing operation, the injection states of the diffusion pilot fuel gas and the main fuel gas are set to off, and the injection states of the diffusion pilot fuel oil and the main fuel oil are set to on (Step S13).

After the injection states of the diffusion pilot fuel gas, the main fuel gas, the diffusion pilot fuel oil, and the main fuel oil are set in Step S13, the vent valve 26b, provided in the atmospheric discharge pipe 26a, is opened (Step S14). Then, the on-off valves 22a and 22b, provided in the sweep-air supply pipe 21, are opened, guiding cooled sweep air to the diffusion fuel gas supply pipes 53b. Thus, the sweep action for the diffusion fuel gas supply pipes 53b is started (set to on) (Step S15).

If it is determined in Step S12 that the gas turbine is in the gas-firing operation, the injection states of the diffusion pilot fuel oil and the main fuel oil are set to off, and the injection states of the diffusion pilot fuel gas and the main fuel gas are set to on (Step S16). The sweep operation action ends without sweeping the diffusion fuel gas supply pipes 53b (Step S17).

As described above, according to the gas turbine of this embodiment and a gas turbine combined plant having the same, the following advantages are afforded.

Sweep air (sweep fluid) cooled by the cooling fins (sweep-fluid cooling means) 23 to about 440° C., which is lower than the self-ignition temperature of methane (about 450° C.), which is a major component of the diffusion pilot fuel gas (gaseous fuel), is guided from the sweep-air supply pipe (sweep-fluid supply channel) 21 to the diffusion fuel gas supply pipes (fuel/sweep-fluid supply channels) 53b, which are used for combustion by the diffusion method. In this way, when the gas turbine is in the oil-firing operation (liquid-fuel firing operation), by guiding sweep air cooled to a temperature lower than the above-described self-ignition temperature to the sweep-air supply pipe 21, it is possible to prevent self-ignition of methane, which is a major component of the diffusion pilot fuel gas remaining in the diffusion fuel gas supply pipes 53b, and to prevent burnout of the pilot nozzle (gas-turbine fuel nozzle) 51. Therefore, the soundness of the gas turbine can be maintained.

Fifth Embodiment

This embodiment differs from the first embodiment in that main nozzles are swept and is the same in the other points. Therefore, identical reference symbols are assigned to the same structures as those of the first embodiment, and a description thereof will be omitted.

Figure 10:
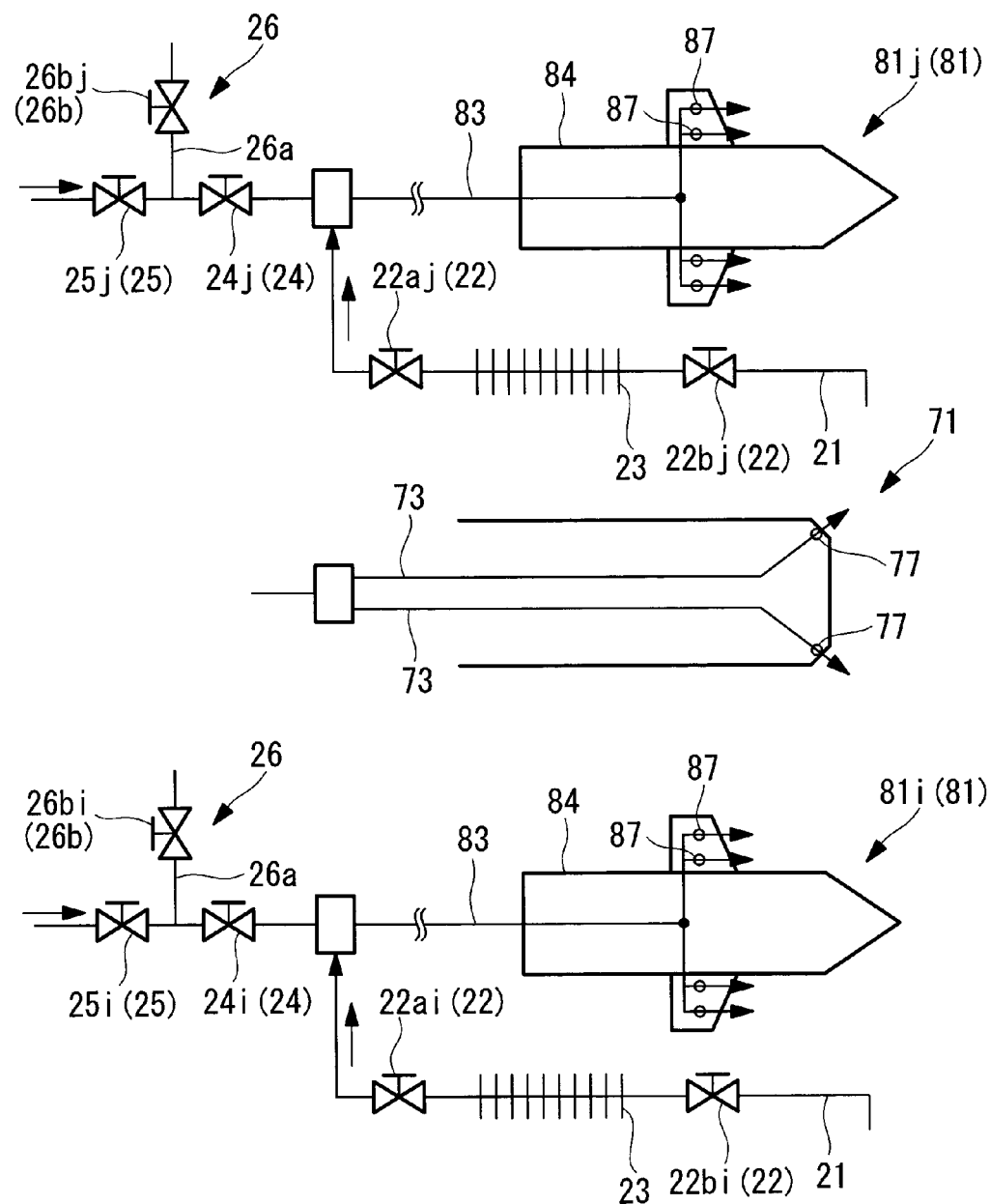
FIG. 10 is a diagram showing, in outline, the structure of a gas turbine having sweep-fluid cooling means, according to a fifth embodiment of the present invention.
Figure 11:
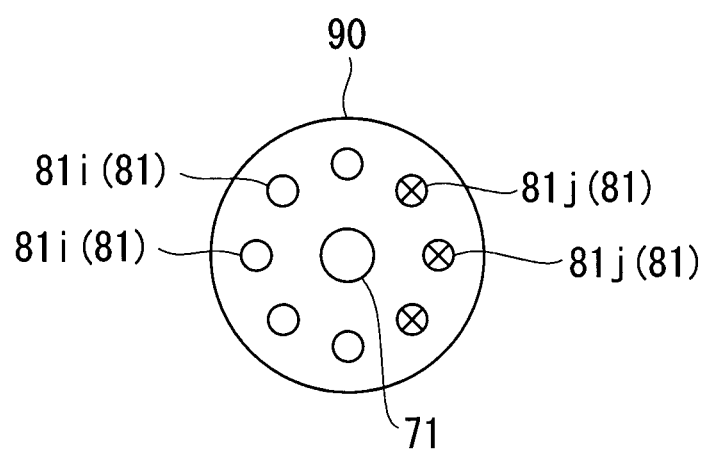
FIG. 11 is a longitudinal-section diagram showing, in outline, the structure of a combustor of the gas turbine shown in FIG. 10.

FIG. 10 is a diagram showing, in outline, the structure of a gas turbine having sweep-fluid cooling means, according to this embodiment. FIG. 11 is a longitudinal-section diagram showing, in outline, the structure of a combustor of the gas turbine shown in FIG. 10.

As shown in FIG. 11, a combustor 90 provided in the gas turbine includes a pilot nozzle 71 and a plurality of (for example, eight) main nozzles (gas-turbine fuel nozzles) 81 disposed around the pilot nozzle 71. The eight main nozzles 81 are used in a staging method in which injection of the main fuel gas (fuel) therefrom is selectively stopped and started.

As shown in FIG. 10, pilot-nozzle fuel supply pipes 73 provided in the pilot nozzle 71 are used in the diffusion method, and fuel gas (hereinafter, referred to as "pilot fuel gas") is supplied thereto. The pilot fuel gas supplied to the pilot-nozzle fuel supply pipes 73 is injected from pilot-nozzle injection holes 77 that are provided at downstream sides of the pilot-nozzle fuel supply pipes 73.

The main nozzles 81 are used to supply main fuel gas (gaseous fuel), serving as fuel, to the airflow in the combustor 90 (see FIG. 11) by the premix method. The main nozzles 81 each include a main-nozzle fuel supply pipe (fuel/sweep-fluid supply channel) 83, a main-nozzle main body 84 that includes the main-nozzle fuel supply pipe 83 and is disposed along the direction in which air flows in the combustor 90, and main-nozzle injection holes 87 (injection holes) that are formed at downstream sides of the main-nozzle main body 84.

The downstream end of the main-nozzle fuel supply pipe 83 is branched into a plurality of pipes where the plurality of main-nozzle injection holes 87 for injecting the main fuel gas guided from the main-nozzle fuel supply pipe 83 are provided. The main-nozzle injection holes 87, which communicate with the pipes branched from the main-nozzle fuel supply pipe 83, are provided closer to the upstream side of the airflow in the combustor 90 than the pilot-nozzle injection holes 77 provided in the pilot nozzle 71 are. The main fuel gas injected into the airflow from the main-nozzle fuel supply pipe 83 is combusted by using a flame generated with the pilot nozzle 71 as a pilot burner.

The sweep-air supply pipe 21, which guides, as sweep air (sweep fluid), high-temperature air (for example, about 500° C.) extracted from the casing of the gas turbine (not shown), is connected to the main-nozzle fuel supply pipe 83. The sweep-air supply pipe 21 is provided with the two on-off valves 22. Between the two on-off valves 22a and 22b, the plurality of cooling fins (sweep-fluid cooling means) 23 are provided around the sweep-air supply pipe 21. The plurality of cooling fins 23 provided around the sweep-air supply pipe 21 release the heat of the high-temperature sweep air guided to the sweep-air supply pipe 21. The high-temperature sweep air passing through the sweep-air supply pipe 21 is cooled with the cooling fins 23.

The fuel-flow-rate control valve 24 that controls the flow rate of the main fuel gas to be supplied to the main-nozzle fuel supply pipe 83; the fuel-pressure control valve 25 that controls the pressure of the main fuel gas; and the atmospheric discharge means 26 that is provided at a portion between the fuel-flow-rate control valve 24 and the fuel-pressure control valve 25 and that discharges, to the atmosphere, the sweep air that has been guided to the portion between the fuel-flow-rate control valve 24 and the fuel-pressure control valve 25 from the main-nozzle fuel supply pipe 83 are provided on the upstream side of the main-nozzle fuel supply pipe 83.

Next, a sweep action performed in the gas turbine of this embodiment will be described by using a valve timing chart shown in FIG. 12 and a flowchart shown in FIG. 13.

Figure 12:
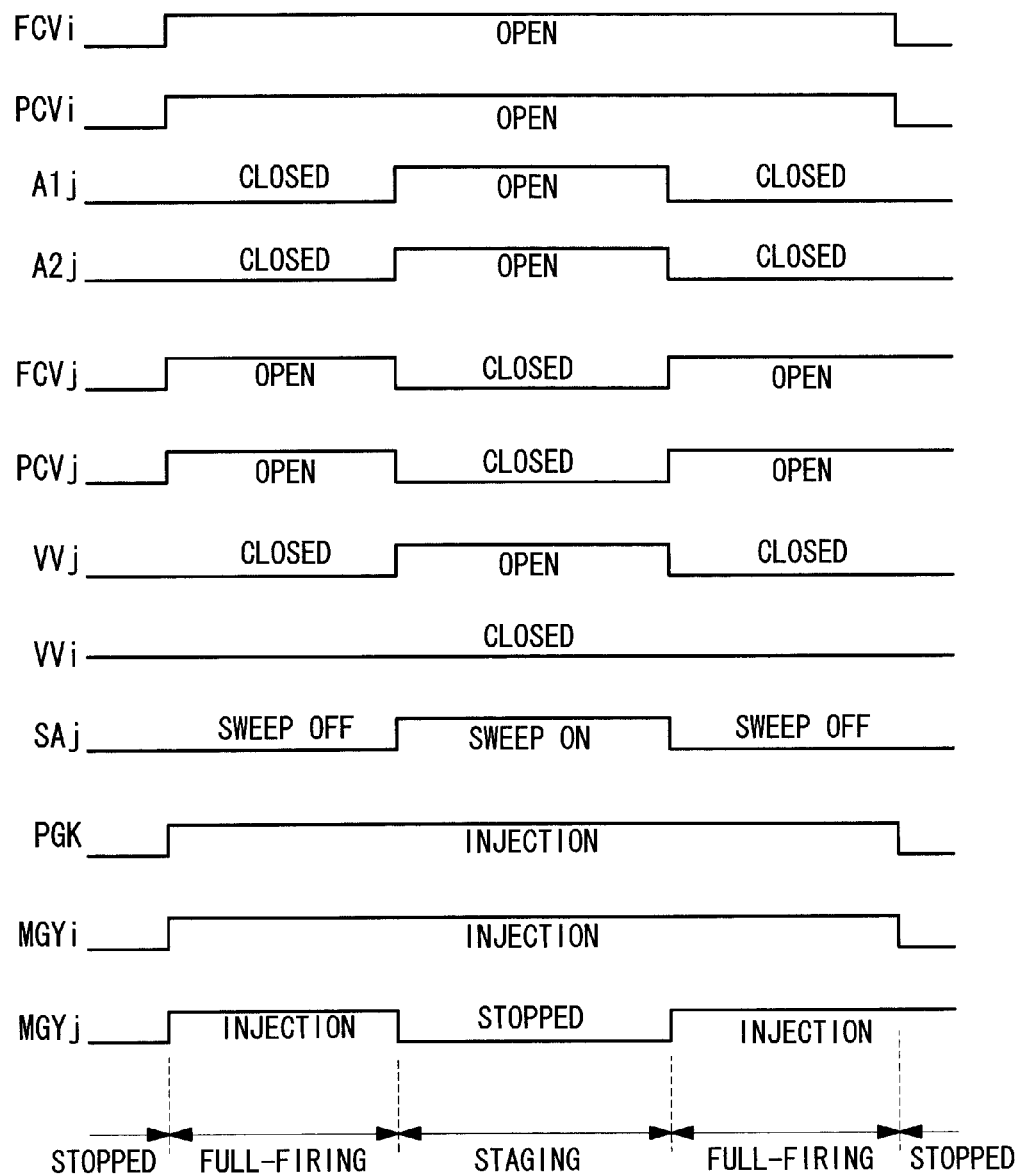
FIG. 12 is a valve timing chart for the gas turbine shown in FIG. 10.
Figure 13:
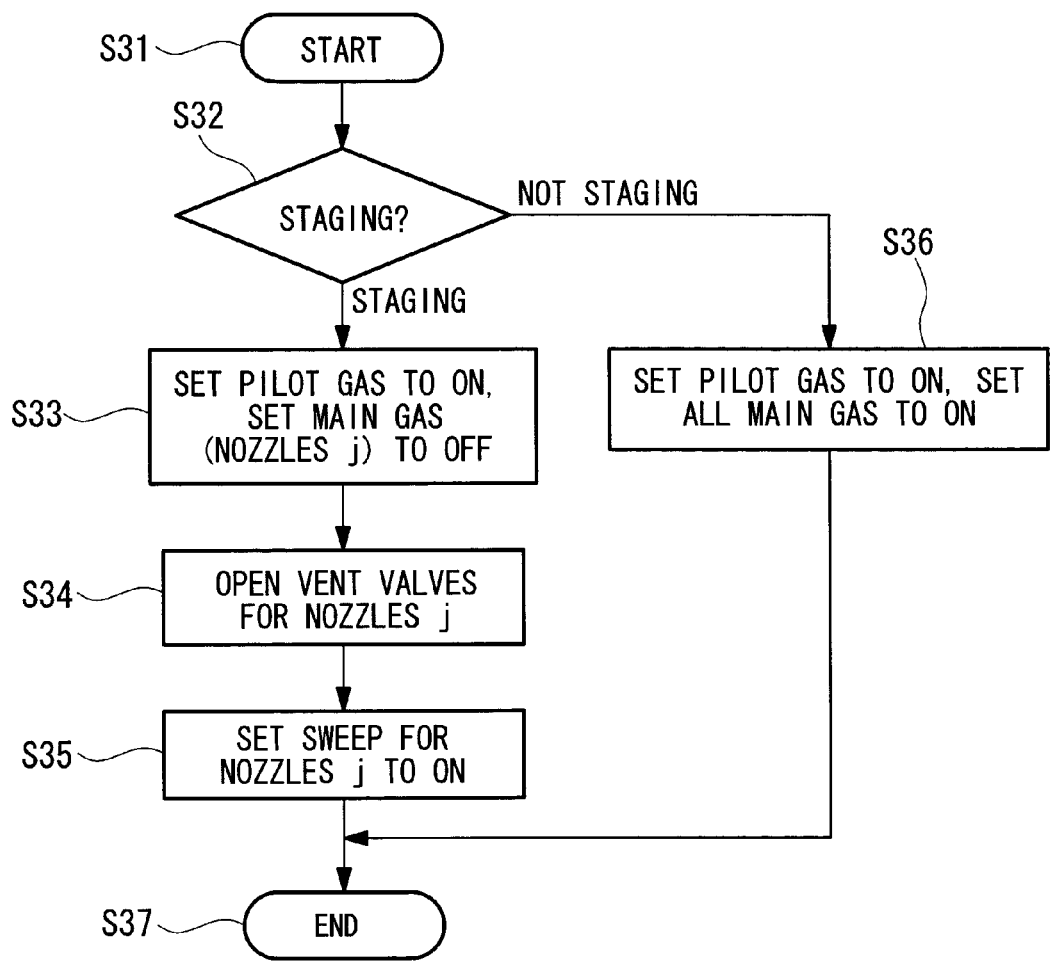
FIG. 13 is a flowchart of a sweep action performed in the gas turbine shown in FIG. 10.

FIG. 12 shows the valve timing chart for the gas turbine shown in FIGS. 10 and 11.

In the valve timing chart of FIG. 12, A1 indicates an open/closed state of the on-off valve 22a, provided in the sweep-air supply pipe 21; A2 indicates an open/closed state of the on-off valve 22b; FCV indicates open/closed states of the fuel-flow-rate control valves 24 provided on the upstream sides of the main-nozzle fuel supply pipes 83; PCV indicates open/closed states of the fuel-pressure control valves 25; VV indicates open/closed states of the vent valves 26b provided in atmospheric discharge pipes 26a; SA indicates an on/off state of the sweep action; PGK indicates an injection state of the pilot fuel gas injected from the pilot nozzle 71; and MGY indicates injection states of the main fuel gas injected from the main nozzles 81 according to a loading state of the gas turbine.

Here, j assigned to A1, A2, FCV, PCV, VV, SA, and MGY shown in FIG. 12 corresponds to main nozzles 81j that stop and start injection of the main fuel gas when a staging operation is performed in the staging method in which the main fuel gas is injected selectively from the main nozzles 81, and i assigned similarly corresponds to main nozzles 81i that do not stop injection of the main fuel gas even when the staging operation is performed.

Examples of the main nozzles 81 that stop injection of the main fuel gas when the staging operation is performed include a main nozzle 81j located at the top in FIG. 10, and, for example, three main nozzles (x marks in white circles) 81j located at the right side in FIG. 11. Furthermore, examples of the main nozzles 81 that do not stop injection of the main fuel gas even when the staging operation is performed include a main nozzle 81i located at the bottom in FIG. 10, and, for example, five main nozzles 81i (white circles) located at the left side in FIG. 11.

When the operation of the gas turbine is stopped, on-off valves 22ai, 22aj, 22bi, and 22bj provided in all sweep-air supply pipes 21, fuel-pressure control valves 25i and 25j, fuel-flow-rate control valves 24i and 24j, and vent valves 26bi and 26bj are closed, and injection of the pilot fuel gas from the pilot nozzle 71 and injection of the main fuel gas from the main nozzles 81i and 81j are stopped.

When the gas turbine is ignited to be in a full-firing operation, the fuel-pressure control valves 25i and 25j and the fuel-flow-rate control valves 24i and 24j are opened, and the on-off valves 22ai, 22aj, 22bi, and 22bj and the vent valves 26bi and 26bj are closed. Since the fuel-pressure control valves 25i and 25j and the fuel-flow-rate control valves 24i and 24j are opened, the main fuel gas is injected from all of the main nozzles 81i and 81j, for combustion. In this case, the pilot fuel gas is injected from the pilot nozzle 71 and is used as a pilot burner for the main nozzles 81i and 81j.

When the gas turbine is in the staging operation, injection of the main fuel gas from the main nozzles 81j is stopped, and combustion is performed with injection of the main fuel gas from the main nozzles 81i and injection of the pilot fuel from the pilot nozzle 71.

In this case, the fuel-pressure control valves 25j and the fuel-flow-rate control valves 24j for the main nozzles 81j are closed, thus stopping the supply of the main fuel gas therefrom. Furthermore, the on-off valves 22*aj* and 22*bj* and the vent valves 26*bj* for the main nozzles 81*j* are opened. Since the on-off valves 22*aj* and 22*bj* are opened, sweep air extracted from the casing of the gas turbine and guided to the sweep-air supply pipes 21 that are connected to the main nozzles 81*j* is guided to the main-nozzle fuel supply pipes 83 of the main nozzles 81*j*, thus starting (setting to on) the sweep of the main-nozzle fuel supply pipes 83.

On the other hand, the fuel-pressure control valves 25*i* and the fuel-flow-rate control valves 24*i* for the main nozzles 81*i* are opened, and the main fuel gas is injected from the main nozzles 81*i*. Furthermore, since the on-off valves 22*ai* and 22*bi* and the vent valves 26*bi* for the main nozzles 81*i* are closed, sweep air is not guided to the main-nozzle fuel supply pipes 83 of the main nozzles 81*i*.

In this way, injection of the main fuel gas from the main nozzles 81*j* is stopped to guide sweep air to the main nozzles 81*j*, and injection of the main fuel gas from the main nozzles 81*i* is performed, thereby making it possible to achieve a reduction in the emission level of NOx (nitrogen oxide) while the gas turbine is operating under low load and to prevent burnout of the main nozzles 81*j*.

When the gas turbine stops the staging operation, the fuel-pressure control valves 25*i* and 25*j* and the fuel-flow-rate control valves 24*i* and 24*j* are opened, and the on-off valves 22*ai*, 22*aj*, 22*bi*, and 22*bj* and the vent valves 26*bi* and 26*bj* are closed. The pilot fuel gas is injected from the pilot-nozzle fuel supply pipes 73 of the pilot nozzle 71 into the combustor 90. Furthermore, since the fuel-pressure control valves 25*i* and 25*j* and the fuel-flow-rate control valves 24*i* and 24*j* are opened, the main fuel gas is injected from the main-nozzle fuel supply pipes 83 of the main nozzles 81*i* and 81*j*.

The flowchart of the sweep action in the valve timing chart shown in FIG. 12 will be described with reference to FIG. 13.

The sweep operation action for the main nozzles 81*j* is started (Step S31). When the sweep operation action is started, it is determined whether the gas turbine is in the staging operation (Step S32). If it is determined in Step S32 that the gas turbine is in the staging operation, the injection state of the pilot fuel gas injected from the pilot nozzle 71 is set to on, the injection state of the main fuel gas injected from the main nozzles 81*j* is set to off, and the injection state of the main fuel gas injected from the main nozzles 81*i* is set to on (Step S33).

After the injection states of the pilot nozzle 71, the main nozzles 81*j*, and the main nozzles 81*i* are set in Step S33, the vent valves 26*bj* for the main nozzles 81*j* are opened (Step S34). Then, the on-off valves 22*aj* and 22*bj* for the main nozzles 81*j* are opened, guiding cooled sweep air to the main-nozzle fuel supply pipes 83 of the main nozzles 81*j*. Thus, the sweep action for the main-nozzle fuel supply pipes 83 of the main nozzles 81*j* is started (set to on) (Step S35).

If it is determined in Step S32 that the gas turbine is not in the staging operation, the injection states of the pilot fuel gas injected from the pilot nozzle 71 and the main fuel gas injected from all of the main nozzles 81*i* and 81*j* are set to on (Step S36), and the sweep operation action ends without sweeping the main nozzles 81*j* (Step S37).

As described above, according to the gas turbine of this embodiment and a gas turbine combined plant having the same, the following advantages are afforded.

When the gas turbine is operated by the staging method, cooled sweep air (sweep fluid) is supplied to the main-nozzle fuel supply pipes (fuel/sweep-fluid supply channels) 83 of the main nozzles (gas-turbine fuel nozzles) 81*j* from which injection of the main fuel gas (fuel) is stopped. Thus, it is possible to prevent self-ignition of methane, which is a major component of the main fuel gas remaining in the main-nozzle fuel supply pipes 83 of the main nozzles 81*j* from which injection of the main fuel gas is stopped, and to prevent burnout of the main nozzles 81*j*. Therefore, the soundness of the gas turbine can be maintained.

Sixth Embodiment

This embodiment differs from the first embodiment in that a warming pipe and a hollow pipe (for atmospheric discharge) extend from the sweep-air supply pipe, and a drain pipe is provided at an immediately downstream side of the cooling fins, and is the same in the other points. Therefore, identical reference symbols are assigned to the same structures and the sweep action performed during operation under load, and a description thereof will be omitted.

Figure 14:
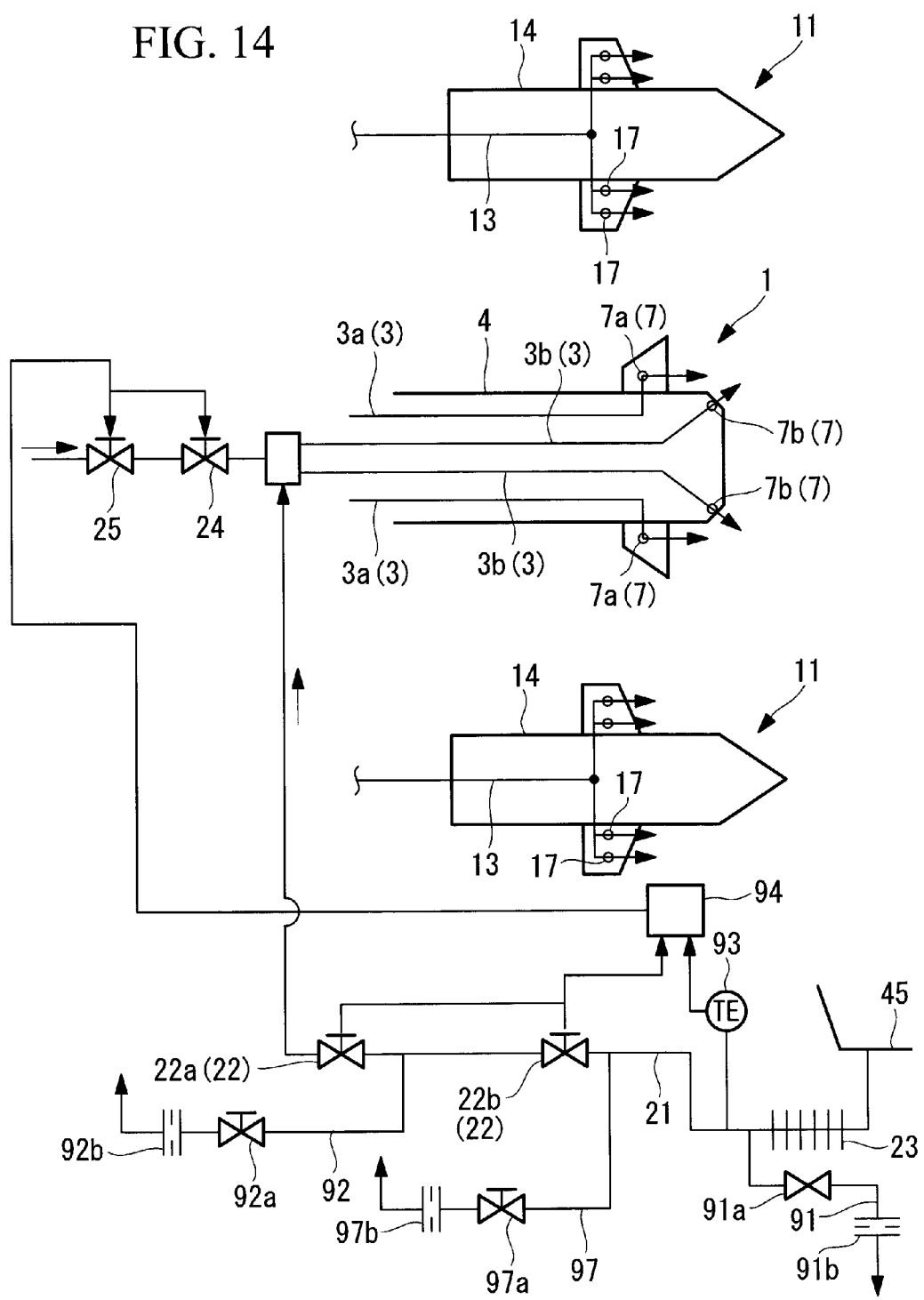
FIG. 14 is a diagram showing, in outline, the structure of a gas turbine having sweep-fluid cooling means, according to a sixth embodiment of the present invention.

FIG. 14 is a diagram showing, in outline, the structure of sweep-fluid cooling means for sweep air guided to a gas turbine according to this embodiment.

The sweep-air supply pipe (sweep-fluid supply channel) 21, which guides, as sweep air (sweep fluid), high-temperature air (for example, about 500° C.) extracted from the casing 45 of the gas turbine (not shown) to the diffusion fuel supply pipes (fuel/sweep-fluid supply channels) 3*b*, is provided with the on-off valves (sweep-fluid supply on-off valves) 22 at two positions on the downstream side of the cooling fins (sweep-fluid cooling means) 23. Of the on-off valves 22, a sweep-air shutoff valve 22*b* is located closer to the casing 45, and a sweep-air supply valve 22*a* is located closer to the diffusion fuel supply pipes 3*b*.

The sweep-air supply valve 22*a* and the sweep-air shutoff valve 22*b* are completely opened when the sweep air is supplied to the diffusion fuel supply pipes 3*b*, i.e., when the sweep action is set to on, and are completely closed when the sweep action is set to off.

The sweep-air supply valve 22*a* and the sweep-air shutoff valve 22*b* are provided with two limit switches (degree-of-opening detection means) (not shown) for detecting the degrees-of-opening thereof. The limit switches detect the degrees-of-opening of the valves 22*a* and 22*b*, i.e., whether the valves 22*a* and 22*b* are completely open or completely closed, and send signals for the degrees-of-opening to a control device 94, to be described later.

The plurality of cooling fins 23 are provided around a portion of the sweep-air supply pipe 21 between the sweep-air shutoff valve 22*b* and the casing 45. Furthermore, a warming pipe 97 and a drain pipe (sweep-fluid discharge channel) 91 extend from the portion between the cooling fins 23 and the sweep-air shutoff valve 22*b*. Furthermore, a hollow pipe (sweep-fluid depressurizing channel) 92 extends from a portion of the sweep-air supply pipe 21 between the sweep-air shutoff valve 22*b* and the sweep-air supply valve 22*a*.

One end of the warming pipe 97 is open to the atmosphere or is connected to an exhaust side of the gas turbine. The warming pipe 97 is provided with a sweep warming valve (sweep-fluid discharge on-off valve) 97*a* that is operated in conjunction with the actuation of the sweep-air supply valve 22*a* and/or the sweep-air shutoff valve 22*b*, and an orifice 97*b*.

The sweep warming valve 97*a* is an on-off valve for exhausting the sweep air from the warming pipe 97, is completely opened when the sweep action is set to off (i.e., when the sweep-air supply valve 22*a* and/or the sweep-air shutoff valve 22*b* is completely closed), and is completely closed when the sweep action is set to on (i.e., when the sweep-air supply valve 22*a* and the sweep-air shutoff valve 22*b* are completely opened). Thus, when the sweep action is set to off, the inside of the sweep-air supply pipe 21 can be warmed, thus suppressing the occurrence of condensation.

The orifice 97b is provided at the downstream side of the sweep warming valve 97a. The orifice 97b limits the flow rate of the sweep air to be exhausted to the atmosphere from the warming pipe 97.

One end of the drain pipe 91 is open vertically downward. The drain pipe 91 is provided with a sweep drain valve (sweep-fluid discharge on-off valve) 91a that is operated in conjunction with the actuation of the sweep-air supply valve 22a and/or the sweep-air shutoff valve 22b, and an orifice 91b.

The sweep drain valve 91a is an on-off valve for discharging a drain flow generated in the sweep-air supply pipe 21 from the drain pipe 91, is completely opened immediately after the gas turbine is started-up (until 10% of the rated speed is obtained), and is completely closed when the gas turbine becomes stable after starting-up. Thus, a drain flow generated in the sweep-air supply pipe 21 can be discharged from the warming pipe 91 to the outside.

The orifice 91b is provided at the downstream side of the sweep drain valve 91a. The orifice 91b limits the flow rate of the drain flow to be discharged from the drain pipe 91 to the outside together with the drain flow.

One end of the hollow pipe 92 is open to the atmosphere, and sweep air or backflow diffusion pilot fuel gas (fuel) is exhausted from the portion between the sweep-air shutoff valve 22b and the sweep-air supply valve 22a to the atmosphere, in the event of valve abnormality, to be described later.

The hollow pipe 92 is provided with a sweep-air release valve (sweep-fluid depressurizing on-off valve) 92a that is operated in conjunction with the actuation of the sweep-air supply valve 22a or the sweep-air shutoff valve 22b (at least one of them), and an orifice 92b. Specifically, the sweep-air release valve 92a is an on-off valve for exhausting sweep air or backflow diffusion pilot fuel gas from the hollow pipe 92 in the event of valve abnormality, to be described later, is completely opened when the sweep action is set to off, and is completely closed when the sweep action is set to on.

The orifice 92b is provided at the downstream side of the sweep-air release valve 92a. The orifice 92b limits the flow rate of fluid to be discharged to the atmosphere from an open end of the hollow pipe 92 if the sweep-air supply valve 22a or the sweep-air shutoff valve 22b is in an abnormal state (e.g., when the valve cannot be completely closed).

A temperature sensor (temperature detection means) 93 is provided on the downstream side of the cooling fins 23 at a portion of the sweep-air supply pipe 21 between the sweep-air shutoff valve 22b and the warming pipe 91. The temperature sensor 93 detects the temperature of sweep air flowing at the downstream side of the plurality of cooling fins 23 and sends the signal therefor to the control device 94.

The control device 94 has an automatic load reduction function (load reduction function) for reducing the operating load on the gas turbine and an automatic stop function (emergency stop function) for stopping the operation of the gas turbine. Furthermore, the control device 94 controls the degrees-of-opening of the sweep-air supply valve 22a, the sweep-air shutoff valve 22b, the fuel-flow-rate control valve 24, the fuel-pressure control valve 25, the sweep warming valve 97a, the sweep drain valve 91a, and the sweep-air release valve 92a.

Explanation of Actions

Before the gas turbine is started-up, it is confirmed that the sweep-air supply valve 22a and the sweep-air shutoff valve 22b, provided in the sweep-air supply pipe 21, and the fuel-pressure control valve 25 and the fuel-flow-rate control valve 24, provided on the upstream side of the diffusion fuel supply pipes 3b, are completely closed; that injection of the diffusion pilot fuel gas injected from the diffusion fuel supply pipes 3b, the premixed pilot fuel gas injected from the premixed-fuel supply pipes 3a, and the main fuel gas injected from the main nozzles 11 is stopped; and that the sweep warming valve 97a, the sweep drain valve 91a, and the sweep-air release valve 92a are completely open.

Start-Up

The gas turbine is started-up in this state. Here, at the time of start-up of the gas turbine, the temperature of sweep air flowing from the casing 45 to the sweep-air supply pipe 21 is not increased enough. If the sweep air extracted from the casing 45 is cooled with the plurality of cooling fins 23 in this state, the sweep air is condensed to cause a drain flow, in some cases. Thus, the sweep drain valve 91a provided in the drain pipe 91 is completely opened, thereby making it possible to discharge the drain flow in the sweep air from the open end of the drain pipe 91. Furthermore, since the sweep warming valve 97a is open, the sweep air flows in the sweep-air supply pipe 21; therefore, it is possible to sufficiently increase the temperature of the sweep-air supply pipe 21, thus suppressing the occurrence of condensation.

When a predetermined period of time has elapsed after the speed of the started-up gas turbine has reached 10% of the rated speed, for example, the sweep drain valve 91a is completely closed. Then, the fuel-pressure control valve 25 and the fuel-flow-rate control valve 24 are opened, thus supplying the diffusion pilot fuel gas to the diffusion fuel supply pipes 3b. As a result, the speed of the gas turbine is increased.

Sweep Action

Next, a sweep action performed when the gas turbine is operating under load will be described with reference to FIGS. 15 and 16.

Figure 15:
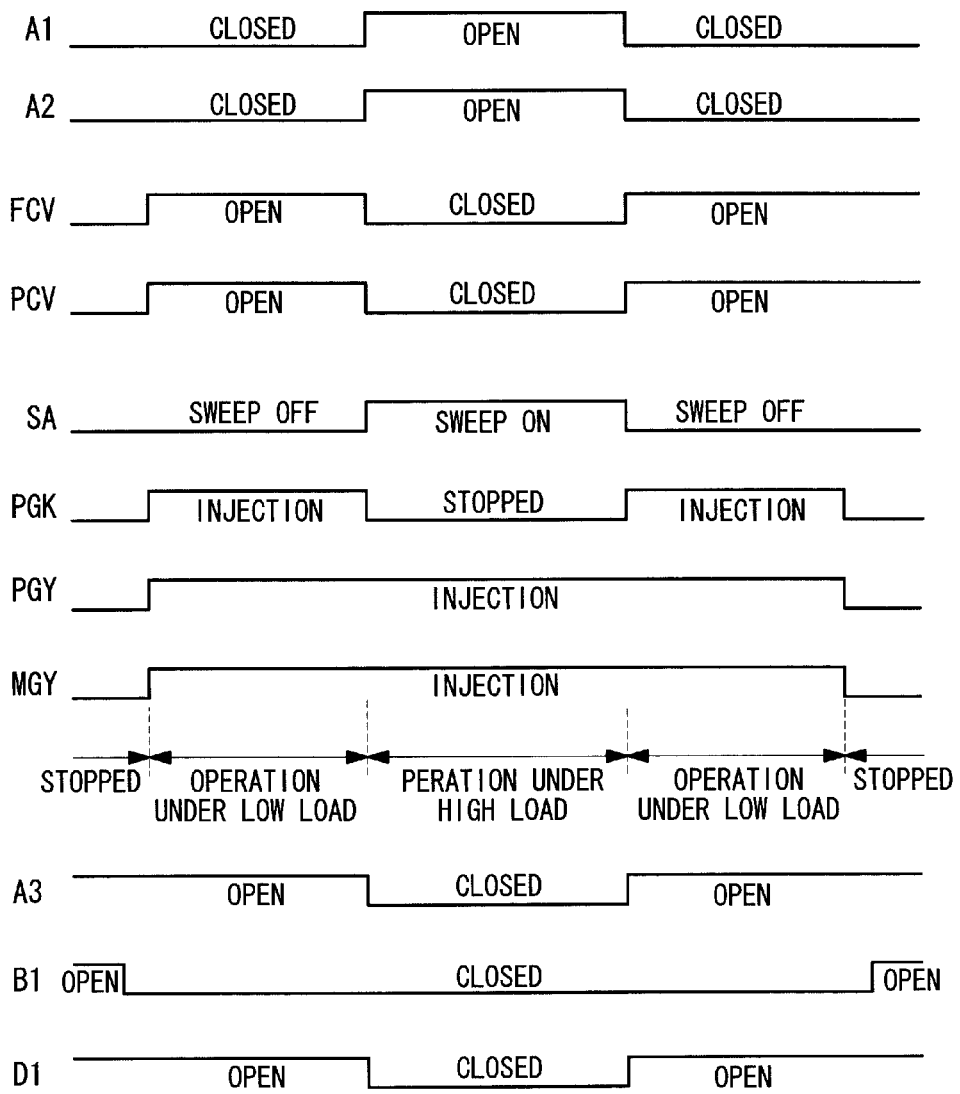
FIG. 15 is a valve timing chart for the gas turbine shown in FIG. 14.

FIG. 15 is a valve timing chart used when the gas turbine shown in FIG. 14 is operating under load.

In the valve timing chart of FIG. 15, A1 indicates an open/closed state of the sweep-air supply valve 22a, provided in the sweep-air supply pipe 21; A2 indicates an open/closed state of the sweep-air shutoff valve 22b; A3 indicates an open/closed state of the sweep-air release valve 92a; FCV indicates an open/closed state of the fuel-flow-rate control valve 24, provided on the upstream side of the diffusion fuel gas supply pipes 3b; PCV indicates an open/closed state of the fuel-pressure control valve 25; SA indicates an on/off state of the sweep action; PGK indicates an injection state of the diffusion pilot fuel gas injected from the diffusion fuel gas supply pipes 3b according to the loading state of the gas turbine; PGY indicates an injection state of the premixed pilot fuel gas injected from the premixed-fuel supply pipes 3a according to the loading state of the gas turbine; MGY indicates an injection state of the main fuel gas injected from the main nozzles 11; B1 indicates an open/closed state of the sweep drain valve 91a; and W indicates the sweep warming valve 97a.

The sweep action of this embodiment is the same as that of the first embodiment except that the sweep-air release valve 92a and the sweep warming valve 97a are completely opened when the gas turbine is operating under low load, the sweep-air release valve 92a and the sweep warming valve 97a are completely closed when the gas turbine is operating under high load, and the sweep drain valve 91a is completely closed when the gas turbine is operating under both low load and high load.

Figure 16:
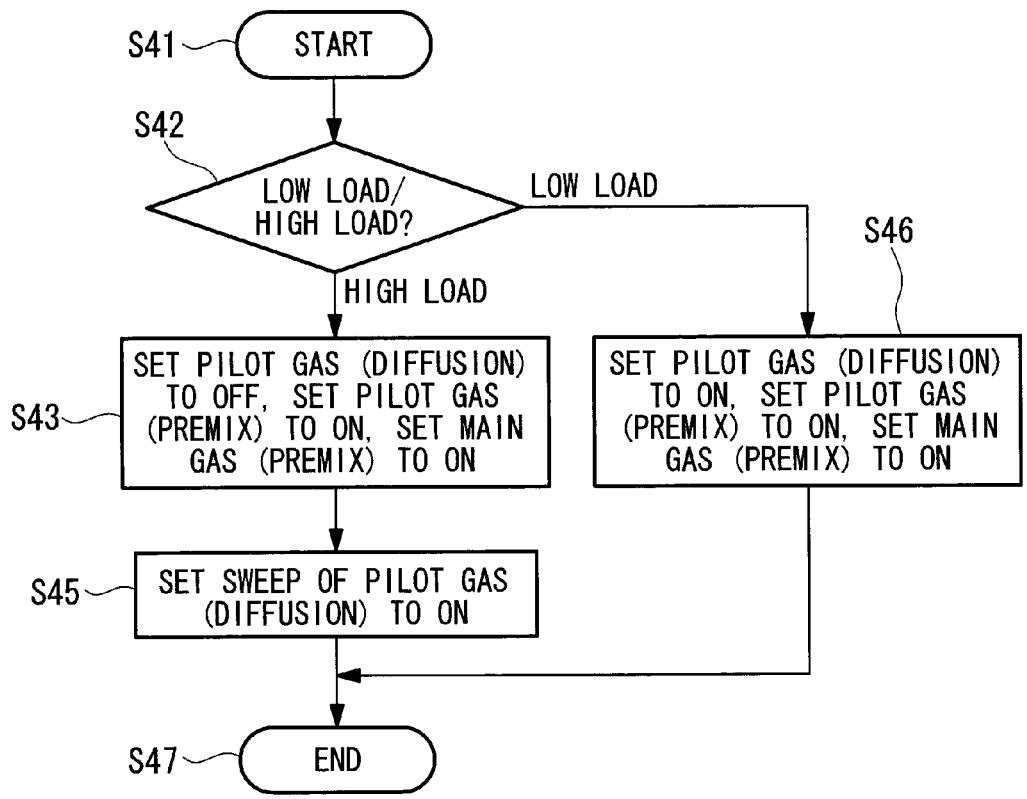
FIG. 16 is a flowchart of a sweep action performed in the gas turbine shown in FIG. 14.

FIG. 16 is a flowchart of the sweep action in the valve timing chart shown in FIG. 15.

Figure 4:
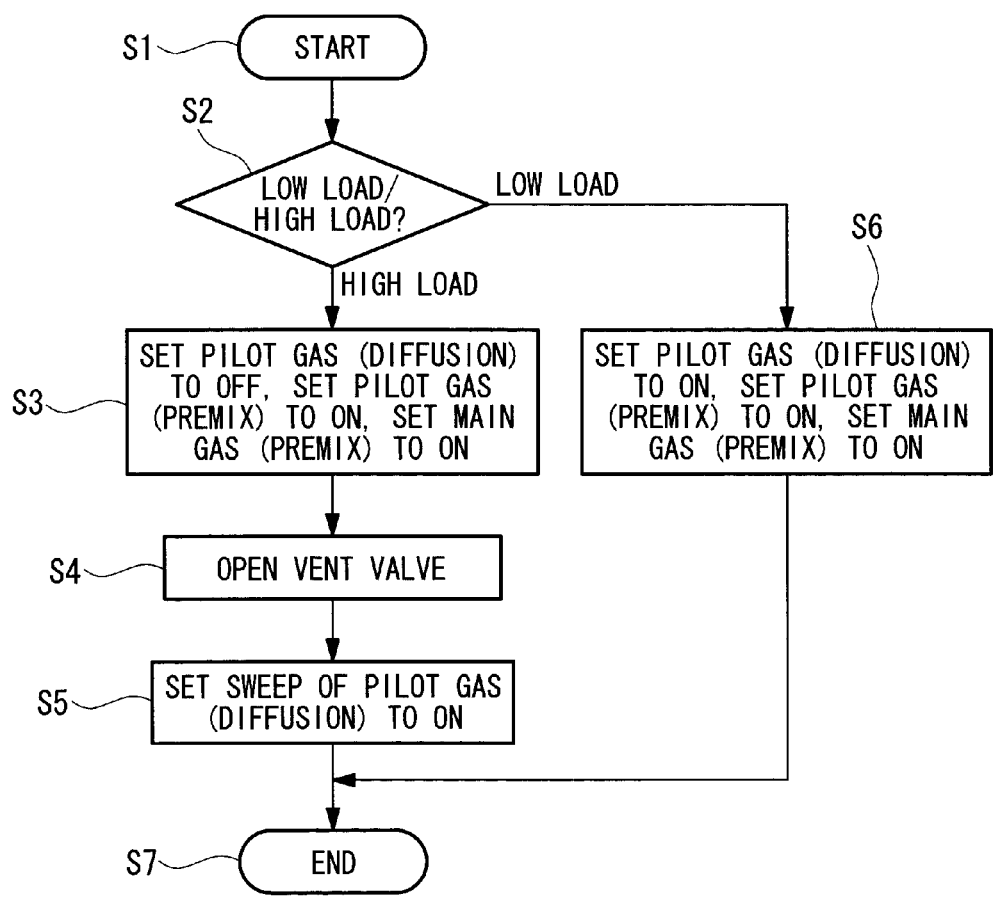
FIG. 4 is a flowchart of a sweep action performed in the gas turbine shown in FIG. 1.

This flowchart is the same as that shown in FIG. 4 except that a step corresponding to Step S4 of FIG. 4 in the first embodiment is not included.

Action Performed when Sweep Air is not Cooled Enough

Next, a description will be given of a case where the temperature sensor 93 provided on the downstream side of the cooling fins 23 detects that the sweep air flowing in the sweep-air supply pipe 21 has a temperature equal to or higher than the self-ignition temperature of the diffusion pilot fuel gas when the sweep action is set to on while the gas turbine is operating under load.

When the temperature of the sweep air is detected, the temperature sensor 93 sends the signal therefor to the control device 94. Based on this signal, the control device 94 determines whether the detected temperature of the sweep air is equal to or higher than the self-ignition temperature of the diffusion pilot fuel gas. Here, if the control device 94 determines that the temperature of the sweep air is equal to or higher than the self-ignition temperature of the diffusion pilot fuel gas, the control device 94 activates the automatic load reduction function (not shown).

By activating the automatic load reduction function, the operating load on the gas turbine is reduced. When the operating load on the gas turbine is reduced, the temperature of sweep air extracted from the casing 45 is reduced. The reduced-temperature sweep air is guided to the diffusion fuel supply pipes 3b via the sweep-air supply pipe 21.

Thereafter, if the control device 94 determines that the temperature of sweep air extracted from the casing 45 of the gas turbine whose operating load has been reduced is not lower than the self-ignition temperature of the diffusion pilot fuel gas, the control device 94 activates the automatic stop function (not shown).

Action Performed when the Sweep-Air Supply Valve or the Sweep-Air Shutoff Valve is in an Abnormal State when Sweep Air is injected Next, a description will be given of a case where the sweep-air supply valve 22a or the sweep-air shutoff valve 22b is not completely opened when supply to the diffusion fuel gas supply pipes 3b is switched from the diffusion pilot fuel gas to sweep air.

When the supply is switched from the diffusion pilot fuel gas to sweep air, both the sweep-air supply valve 22a and the sweep-air shutoff valve 22b are normally completely opened.

However, if the control device 94 determines that the sweep-air supply valve 22a or the sweep-air shutoff valve 22b is not completely opened (is in an abnormal state) based on the degree-of-opening signals, which are sent to the control device 94 from the two limit switches provided in the sweep-air supply valve 22a, when the gas turbine is operated for a long time with this sweep-air deficient state, the pilot nozzle 1 may be damaged.

Therefore, in this embodiment, if the control device 94 determines that there is an abnormality in the sweep-air supply valve 22a or the sweep-air shutoff valve 22b when sweep air is injected, the automatic load reduction function is activated, the sweep-air supply valve 22a and the sweep-air shutoff valve 22b are completely closed, and the sweep-air release valve 92a is completely opened. Thus, the operating load on the gas turbine is reduced, and then the operation of the gas turbine is stopped, thus making it possible to prevent damage to the pilot nozzle 1.

Action Performed when the Sweep-Air Supply Valve and the Sweep-Air Shutoff Valve are in Abnormal States when Sweep Air is Switched Next, a description will be given of a case where the sweep-air supply valve 22a and the sweep-air shutoff valve 22b are not completely closed when supply to the diffusion fuel supply pipes 3b is switched from sweep air to the diffusion pilot fuel gas.

When supply to the diffusion fuel supply pipes 3b is switched from sweep air to the diffusion pilot fuel gas, normally, the sweep-air supply valve 22a and the sweep-air shutoff valve 22b are completely closed, and the fuel-pressure control valve 25 and the fuel-flow-rate control valve 24 are opened, thus starting the supply of the diffusion pilot fuel gas to the diffusion fuel supply pipes 3b.

However, if the control device 94 determines that the sweep-air supply valve 22a and the sweep-air shutoff valve 22b are not completely closed (are in abnormal states) based on the signals sent from the two limit switches provided in each of the sweep-air supply valve 22a and the sweep-air shutoff valve 22b, the double shutoff function of the on-off valves 22a and 22b provided in the sweep-air supply pipe 21 is lost. Specifically, the diffusion pilot fuel gas supplied to the diffusion fuel supply pipes 3b may flow back from the sweep-air supply pipe 21 to the casing 45.

Therefore, in this embodiment, when sweep air is switched, if the control device 94 determines that there are abnormalities in the sweep-air supply valve 22a and the sweep-air shutoff valve 22b, the automatic stop function is activated, the sweep-air supply valve 22a and the sweep-air shutoff valve 22b are completely closed, and the sweep-air release valve 92a is completely opened. Thus, the operation of the gas turbine is stopped, and the soundness of the gas turbine can be ensured.

Note that, since the sweep-air release valve 92a is completely opened, diffusion pilot fuel gas that has flowed back from the diffusion fuel supply pipes 3b to the sweep-air supply pipe 21 can be exhausted from the hollow pipe 92.

Action Performed at the Time of Load Rejection

If load rejection occurs while the sweep action is set to on, diffusion pilot fuel for maintaining the flame cannot be injected immediately. Therefore, at the time of load rejection, the flow rate of the premixed pilot fuel gas supplied to the premixed-fuel supply pipes 3a is increased for a certain period of time. Thus, it is possible to depressurize the diffusion fuel supply pipes 3b to which sweep air has been supplied and to stabilize the flame.

Specifically, after a predetermined period of time elapses since the flow rate of the premixed pilot fuel gas was increased, the control device 94 reduces the flow rate of the premixed pilot fuel gas and increases the degrees-of-opening of the fuel-flow-rate control valve 24 and the fuel-pressure control valve 25, provided on the upstream side of the diffusion fuel supply pipes 3b. Thus, it is possible to switch to combustion using the diffusion pilot fuel gas with the flame being stabilized.

Note that the certain period of time for which the flow rate of the premixed pilot fuel gas is increased corresponds to a period of time in which the rotational speed of the gas turbine becomes stable, and is set to 60 seconds, for example.

As described above, according to the gas turbine of this embodiment and a gas turbine combined plant having the same, the following advantages are afforded.

The on-off valves (sweep-fluid supply on-off valves) 22 are provided in the sweep-air supply pipe (sweep-fluid supply channel) 21 on the downstream side of the cooling fins (sweep-fluid cooling means) 23, and the drain pipe (sweep-fluid discharge channel) 91 extends from the portion of the sweep-air supply pipe 21 between the on-off valves 22 and the cooling fins 23. Furthermore, the sweep drain valve (sweep-fluid discharge on-off valve) 91a is provided in the drain pipe 91, and, when the gas turbine (not shown) is started-up, the sweep drain valve 91a is completely opened, and the on-off valves 22 are completely closed. Thus, a drain flow generated when the gas turbine is started-up can be discharged from the drain pipe 91. Therefore, it is possible to prevent the drain flow from being mixed into the diffusion pilot fuel gas (fuel) to be injected from the pilot-nozzle injection holes (injection holes) 7b via the diffusion fuel supply pipes (fuel/sweep-fluid supply channels) 3b.

The sweep-air supply valve (sweep-fluid supply on-off valve) 22a and the sweep-air shutoff valve (sweep-fluid supply on-off valve) 22b, which are on-off valves 22, are provided at two positions in the sweep-air supply pipe 21 on the downstream side of the drain pipe 91. Since the on-off valves 22a and 22b are redundantly provided in this way, even if a fault occurs in one of the on-off valves 22a and 22b, the other one of the on-off valves 22a and 22b can prevent the diffusion pilot fuel gas from flowing back to the casing 45 from the diffusion fuel supply pipes 3b via the sweep-air supply pipe 21.

Furthermore, the sweep warming valve 97a is provided. The sweep warming valve 97a is completely opened when the sweep action is set to off and is completely closed when the sweep action is set to on. Thus, when the sweep action is set to off, it is possible to warm the inside of the sweep-air supply pipe 21, thus suppressing the occurrence of condensation.

The hollow pipe (sweep-fluid depressurizing channel) 92 extends from the portion of the sweep-air supply pipe 21 between the sweep-air supply valve 22a and the sweep-air shutoff valve 22b, and the hollow pipe 92 is provided with the sweep-air release valve (sweep-fluid depressurizing on-off valve) 92a, which is operated in conjunction with the sweep-air supply valve 22a or the sweep-air shutoff valve 22b (at least one of them). Thus, when the sweep-air supply valve 22a is in an abnormal state, even if the diffusion pilot fuel gas flows back from the diffusion fuel supply pipes 3b to the sweep-air supply pipe 21, the backflow diffusion pilot fuel gas can be exhausted from the hollow pipe 92. Therefore, the gas turbine can be safely operated.

The sweep-air supply valve 22a and the sweep-air shutoff valve 22b are provided with the limit switches (degree-of-opening detection means) that can detect the degrees-of-opening of the valves. Furthermore, when sweep air is supplied to the diffusion fuel supply pipes 3b, if the control device 94 determines that the sweep-air supply valve 22a or the sweep-air shutoff valve 22b is not completely opened (is in an abnormal state), the automatic load reduction function (load reduction function) for reducing the operating load on the gas turbine is activated. Thus, it is possible to prevent a situation in which deficient sweep air guided to the diffusion fuel supply pipes 3b damages the pilot nozzle (nozzle) 1 of the gas turbine, thus interfering with the operation of the gas turbine.

The temperature sensor (temperature detection means) 93 for detecting the temperature of sweep air (sweep-fluid) that has been cooled by the cooling fins 23 is provided in the sweep-air supply pipe 21 on the downstream side of the cooling fins 23, and the control device 94 activates the automatic load reduction function (not shown) when the temperature sensor 93 detects that the sweep air has a temperature equal to or higher than the self-ignition temperature of the diffusion pilot fuel gas. Thus, when the temperature of sweep air to be guided to the diffusion fuel supply pipes 3b becomes equal to or higher than the self-ignition temperature of the diffusion pilot fuel gas due to a fault in the cooling fins 23 etc., it is possible to reduce the operating load on the gas turbine, thus reducing the temperature of sweep air extracted from the casing 45 of the gas turbine. Thus, reduced-temperature sweep air can be supplied to the diffusion fuel supply pipes 3b. Therefore, the soundness of the gas turbine can be ensured.

If the control device 94 determines that the temperature of the diffusion pilot fuel gas detected by the temperature sensor 93 is equal to or higher than the self-ignition temperature of the diffusion pilot fuel gas even after the automatic load reduction function is activated, thus reducing the operating load on the gas turbine, the automatic stop function (emergency stop function) of the control device 94 for stopping the operation of the gas turbine is activated.

Furthermore, if load rejection occurs while the sweep action is set to on, the diffusion pilot fuel for maintaining the flame cannot be injected immediately. Therefore, at the time of the load rejection, the control device 94 causes the sweep-air supply valve 22a and the sweep-air shutoff valve 22b to be completely closed, increases the flow rate of the premixed pilot fuel gas (fuel) supplied to the premixed-fuel supply pipes (fuel supply channels) 3a, and then increases the degrees-of-opening of the fuel-pressure control valve 25 and the fuel-flow-rate control valve 24. Thus, it is possible to stabilize the flame in the gas turbine with the premixed pilot fuel gas guided from the premixed-fuel supply pipes 3a and then to perform combustion with the diffusion pilot fuel gas supplied to the diffusion fuel supply pipes 3b. Therefore, the flame holding property of the gas turbine can be maintained.

The orifices 91b and 92b are provided on downstream sides of the sweep drain valve 91a and the sweep-air release valve 92a, respectively. Thus, when sweep air is supplied to the diffusion fuel supply pipes 3b, even if the sweep drain valve 91a or the sweep-air release valve 92a cannot be completely closed due to an abnormality, the orifice 91b or 92b can limit the flow rate of sweep air to be exhausted to the atmosphere from the drain pipe 91 or the hollow pipe 92. Thus, it is possible to prevent a situation in which deficient sweep air guided to the diffusion fuel supply pipes 3b damages the pilot nozzle (nozzle) 1 of the gas turbine, thus interfering with the operation of the gas turbine. Therefore, the gas turbine can be operated while maintaining the soundness thereof.

Seventh Embodiment

This embodiment differs from the sixth embodiment in that a water-cooling heat exchanger is used as the sweep-fluid cooling means and is the same in the other points. Therefore, identical reference symbols are assigned to the same structures and flows of the sweep action as those of the sixth embodiment, and a description thereof will be omitted.

Figure 17:
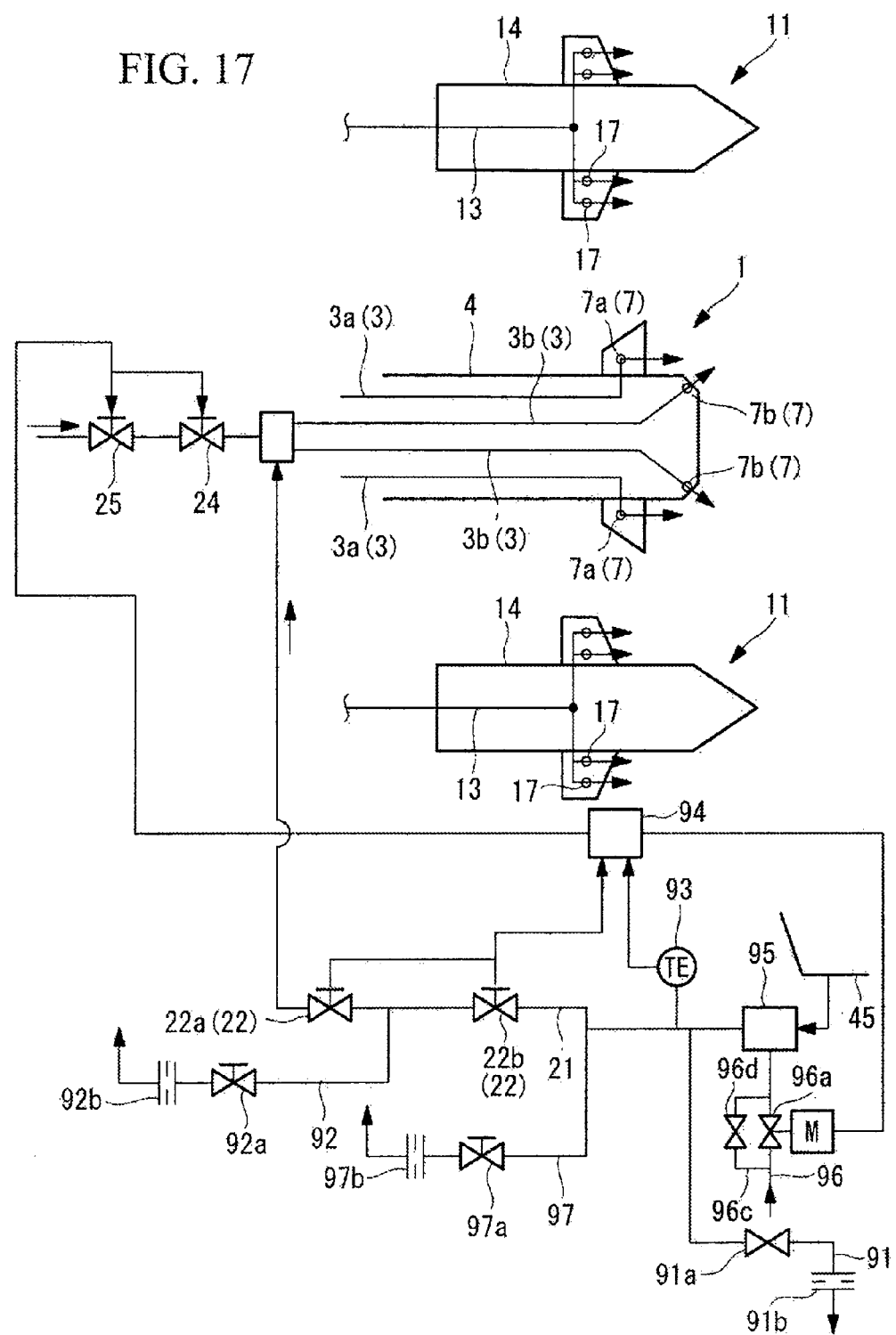
FIG. 17 is a diagram showing, in outline, the structure of a gas turbine having sweep-fluid cooling means, according to a seventh embodiment of the present invention.

FIG. 17 is a diagram showing, in outline, the structure of sweep-fluid cooling means for sweep air guided to a gas turbine according to this embodiment.

A water-cooling cooler (heat-exchange means) 95 is provided in the sweep-air supply pipe 21 (sweep-fluid supply channel), which connects the diffusion fuel supply pipes (fuel/gas supply channels) 3b and the casing 45 of the gas turbine (not shown).

The water-cooling cooler 95 performs heat exchange between air (fluid) at a high temperature (about 500° C.) extracted from the casing 45 and water serving as a cooling medium, and employs a double-pipe system. The air at about 500° C. extracted from the casing 45 is cooled to about 400° C., for example, through heat exchange and is taken out from the cooler 95. The extracted air cooled to about 400° C. through heat exchange with water in the cooler 95 is guided, as sweep air (sweep-fluid), to the sweep-air supply pipe 21 connected at the downstream side of the cooler 95.

Here, using the double-pipe cooler 95 can prevent leakage from a tube (not shown) constituting the cooler 95.

The water serving as a cooling medium in the cooler 95 is supplied to the cooler 95 from a cooling-water supply pipe 96. The cooling-water supply pipe 96 is provided with a cooling-water inlet valve 96a that is a motorized valve. While the gas turbine is stopped, the cooling-water inlet valve 96a is completely closed, shutting off the supply of cooling water to the cooler 95. Thus, the occurrence of a drain flow in the cooler 95 is suppressed while the gas turbine is stopped.

Furthermore, the cooling-water supply pipe 96 is provided with a bypass circuit 96c so as to bypass the cooling-water inlet valve 96a. The bypass circuit 96c is provided with a bypass valve 96d. The bypass valve 96d can guide water serving as a cooling medium to the cooler 95 when the cooling-water inlet valve 96a is completely closed due to a fault in the cooling-water inlet valve 96a while the sweep action is set to on. Thus, boiling in the cooler 95 can be prevented.

Note that, for example, stainless steel (SUS) is used as the materials of the cooler 95 and the sweep-air supply pipe 21. Thus, it is possible to suppress the occurrence of rust caused by sweep air cooled by passing through the cooler 95.

Furthermore, the warming pipe (sweep-fluid discharge channel) 97 is connected to a portion of the sweep-air supply pipe 21 between the sweep-air shutoff valve (sweep-fluid supply on-off valve) 22b and the temperature sensor (temperature detection means) 93, and the hollow pipe (sweep-fluid depressurizing channel) 92 is connected to a portion of the sweep-air supply pipe 21 between the sweep-air shutoff valve 22b and the sweep-air supply valve 22a.

One end of the warming pipe 97 is open to the atmosphere, and the warming pipe 97 is provided with the sweep warming valve (sweep-fluid discharge on-off valve) 97a, which is operated in conjunction with the actuation of the sweep-air supply valve 22a and/or the sweep-air shutoff valve 22b, and the orifice 97b.

As in the sweep drain valve 91a provided in the drain pipe 91, the sweep warming valve 97a is completely opened when the sweep action is set to off (i.e., when the sweep-air supply valve 22a and/or the sweep-air shutoff valve 22b is completely closed) and is completely closed when the sweep action is set to on (i.e., when the sweep-air supply valve 22a and the sweep-air shutoff valve 22b are completely opened).

Furthermore, the orifice 97b limits the flow rate of sweep air to be exhausted to the atmosphere from the warming pipe 97.

Next, the sweep action performed when the gas turbine is operating under load will be described with reference to FIG. 18.

Figure 18:
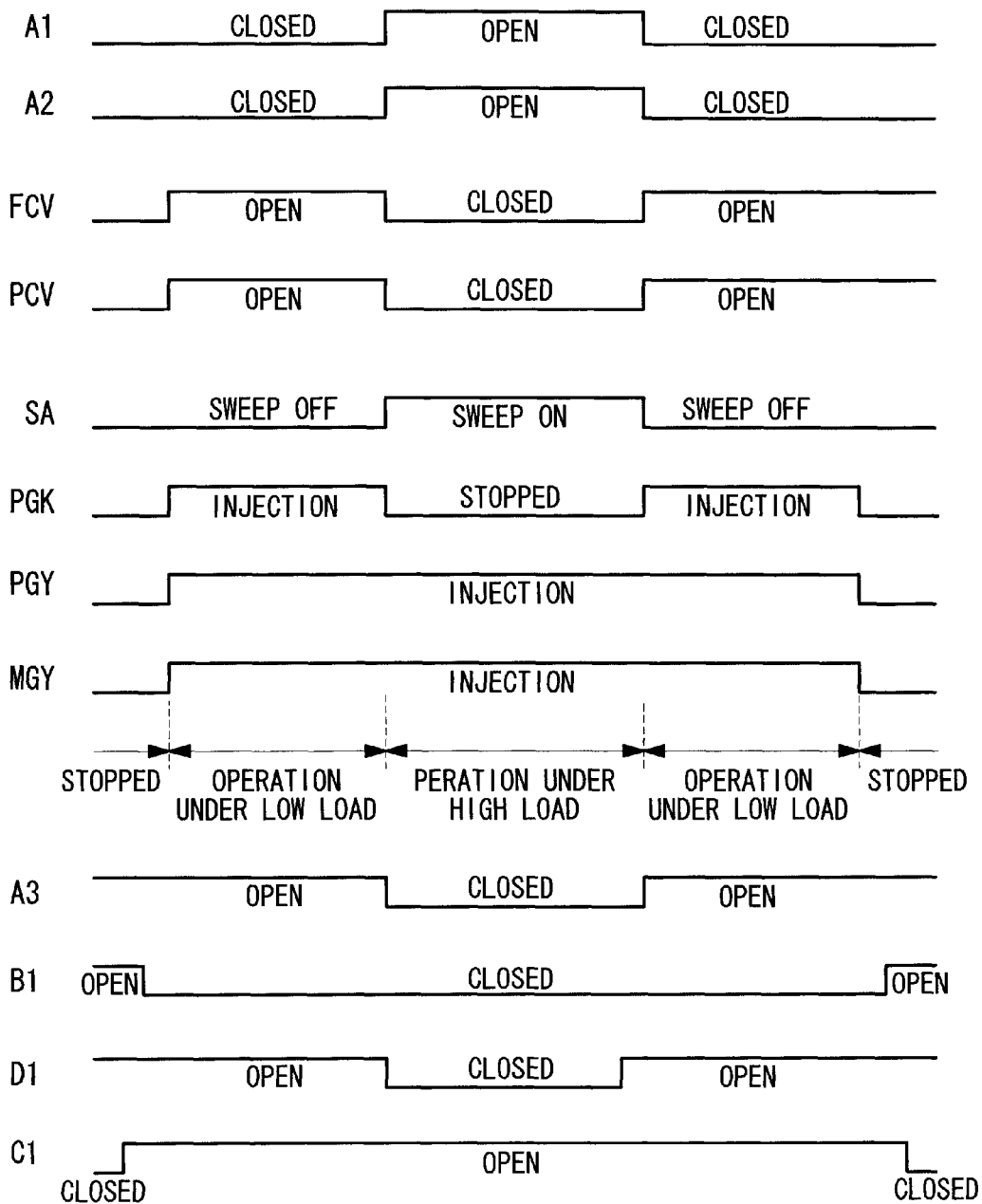
FIG. 18 is a valve timing chart for the gas turbine shown in FIG. 17.

FIG. 18 is a valve timing chart for the gas turbine shown in FIG. 17.

In the valve timing chart of FIG. 18, A1, A2, A3, FCV, PCV, SA, PGK, PGY, MGY, B1, and D1 are the same as those of the sixth embodiment shown in FIG. 15. Note that C1 in FIG. 18 indicates an open/closed state of the cooling-water inlet valve 96a.

Before the gas turbine is started-up, the sweep-air supply valve 22a, the sweep-air shutoff valve 22b, the fuel-pressure control valve 25, the fuel-flow-rate control valve 24, and the cooling-water inlet valve 96a are completely closed, and injection of the diffusion pilot fuel gas, the premixed pilot fuel gas, and the main fuel gas is stopped. Furthermore, the sweep drain valve 91a, the sweep-air release valve 92a, and the sweep warming valve 97a are completely opened.

After the gas turbine is started-up from this state, the degree-of-opening of the cooling-water inlet valve 96a is increased. Then, the fuel-pressure control valve 25 and the fuel-flow-rate control valve 24 are opened and closed, as in the sixth embodiment.

The sweep action of this embodiment is the same as that of the sixth embodiment except that the cooling-water inlet valve 96a is completely opened while the gas turbine is operating under load, and the cooling-water inlet valve 96a is completely closed while the gas turbine is stopped.

As described above, according to the gas turbine of this embodiment and a gas turbine combined plant having the same, the following advantages are afforded.

Water is used as a cooling medium in the cooler (heat-exchange means) 95 for cooling sweep air (sweep fluid). Thus, sweep air can be efficiently cooled, compared with use of air-cooled heat-exchange means.

REFERENCE SIGNS LIST 1 pilot nozzle (gas-turbine fuel nozzle)
3a premixed-fuel supply pipes (fuel supply channels)
3b diffusion fuel supply pipes (fuel/gas supply channels)
7a, 7b pilot-nozzle injection holes (injection holes)
21 sweep-air supply pipe (sweep-fluid supply channel)
23 cooling fins (sweep-fluid cooling means, projections)
24 fuel-flow-rate control valve
25 fuel-pressure control valve
26 atmospheric discharge means
28 gas-turbine enclosure (gas-turbine outer case)
29a suction ports
30 ventilation fans
31, 41 sweep-air supply pipe (sweep-fluid supply channel)
32, 43 air compressor (compressor)
42 TCA cooler (heat-exchange means)
45 casing
51 pilot nozzle (gas-turbine fuel nozzle)
53a diffusion fuel oil supply pipes (fuel supply channels)
53b diffusion fuel gas supply pipes (fuel/sweep-fluid supply channels)
57 pilot-nozzle injection holes (injection holes)
81 main nozzles (gas-turbine fuel nozzles)
83 main-nozzle fuel supply pipes (fuel/sweep-fluid supply channels)
87 main-nozzle injection holes (injection holes)

The invention claimed is:

1. A gas turbine comprising:
a gas-turbine fuel nozzle that includes a plurality of fuel supply channels to which fuel gas is supplied, a plurality of fuel/sweep-fluid supply channels which are separated from the fuel supply channels and to which one of fuel gas and a sweep fluid for sweeping the fuel gas is selectively and switchably supplied, and a plurality of injection holes that are provided at downstream ends of the fuel supply channels and the fuel/sweep-fluid supply channels and that inject the fuel gas or the sweep fluid guided from the fuel supply channels or the fuel/sweep-fluid supply channels; and
a sweep-fluid supply channel that is connected to the fuel/sweep-fluid supply channels and guides the sweep fluid;
wherein the gas turbine is configured to continuously supply the sweep fluid to the fuel/sweep-fluid supply channels while the fuel gas is not supplied to the fuel/sweep-fluid supply channels,
the gas turbine further comprising sweep-fluid cooling means for cooling the sweep fluid to a temperature lower than a self-ignition temperature of the fuel gas.

2. The gas turbine according to claim 1,
wherein the sweep-fluid supply channel is for connecting the fuel/sweep-fluid supply channels and a casing of the gas turbine, and configured to guide, as the sweep fluid, air in the casing to the fuel/sweep-fluid supply channels; and
the sweep-fluid cooling means is a plurality of projections that are provided around the sweep-fluid supply channel.

3. The gas turbine according to claim 2, wherein the plurality of projections are provided adjacent to suction ports for ventilation fans provided on a gas-turbine outer case that encloses the gas turbine.

4. The gas turbine according to claim 1,
wherein the sweep-fluid supply channel is connected to the fuel/sweep-fluid supply channels and to a casing of the gas turbine and guides, as the sweep fluid, a fluid extracted from the casing; and
the sweep-fluid cooling means is heat-exchange means that is provided in the sweep-fluid supply channel and that performs heat exchange between a cooling medium and the sweep fluid.

5. The gas turbine according to claim 4,
wherein the heat-exchange means is a gas-turbine cooling-air cooler; and
the sweep fluid is part of the fluid cooled by the gas-turbine cooling-air cooler.

6. The gas turbine according to claim 4, wherein the heat-exchange means is of a water cooling type that uses water as the cooling medium.

7. A gas turbine according to claim 1, wherein the sweep-fluid cooling means is a compressor that supplies compressed air at a temperature lower than a self-ignition temperature of the fuel gas to the sweep-fluid supply channel as the sweep-fluid.

8. The gas turbine according to claim 1, further comprising a fuel-flow-rate control valve that is provided on a channel which is provided at an upstream side of the fuel/sweep-fluid supply channels and that controls the flow rate of the fuel gas, a fuel-pressure control valve that is provided on the channel and that controls the pressure of the fuel gas, atmospheric discharge pipe branching out from the pipe at a portion between the fuel-flow-rate control valve and the fuel-pressure control valve, and a vent valve provided on the atmospheric discharge pipe.

9. The gas turbine according to claim 1,
wherein the sweep-fluid supply channel comprises a sweep-fluid supply on-off valve on a downstream side of the sweep-fluid cooling means and a sweep-fluid discharge channel that extends from a portion between the sweep-fluid cooling means and the sweep-fluid supply on-off valve;
the sweep-fluid discharge channel comprises a sweep-fluid discharge on-off valve; and
when the gas turbine is started-up, the sweep-fluid supply on-off valve is completely closed, and the sweep-fluid discharge on-off valve is completely opened.

10. The gas turbine according to claim 9,
wherein the sweep-fluid supply on-off valves are provided with two on-off valves located at two positions on the downstream side relative to the sweep-fluid discharge channel,
wherein the gas turbine further comprises a sweep-fluid depressurizing channel branching off from a portion of the sweep-fluid supply channel at a position between the two sweep-fluid supply on-off valves,
wherein the sweep-fluid depressurizing channel comprises a sweep-fluid depressurizing on-off valve that is operated in conjunction with actuation of at least one of the two sweep-fluid supply on-off valves; and
wherein the sweep-fluid depressurizing on-off valve is completely opened when at least one of the two sweep-fluid supply on-off valves is completely closed.

11. The gas turbine according to claim 9, further comprising:
a control device that has a load reduction function for reducing an operating load on the gas turbine and an emergency stop function for stopping the operation of the gas turbine,
wherein the control device is configured to receive a signal which indicates degrees-of-opening of the sweep-fluid supply on-off valve,
wherein the control device activates the emergency stop function and/or the load reduction function when the control device determines that the sweep-fluid supply on-off valves are in abnormal states based on the received signal indicating degrees-of-opening.

12. The gas turbine according to claim 10, wherein an orifice is provided on a downstream side of the sweep-fluid discharge on-off valve or on a downstream side of the sweep-fluid depressurizing on-off valve.

13. The gas turbine according to claim 1, further comprising:
a temperature sensor that is provided on the downstream side of the sweep-fluid cooling means and detects the temperature of the sweep fluid taken out from the sweep-fluid cooling means; and
a control device that has a load reduction function for reducing the operating load on the gas turbine,
wherein the control device operates the load reduction function when the control device determines that the temperature of the sweep fluid detected by the temperature sensor is equal to or higher than a self-ignition temperature of the fuel gas.

14. The gas turbine according to claim 13, wherein, at a period of load rejection, the control device stops the supply of the sweep fluid and increases the flow rate of the fuel gas that is combusted by a premix method and that is supplied to the fuel supply channels.

15. The gas turbine according to claim 1, wherein the gas-turbine fuel nozzle is a pilot nozzle to which the fuel gas is guided, the fuel gas that is combusted by a diffusion method is supplied to the fuel/sweep-fluid supply channels, and the fuel gas that is combusted by a premix method is supplied to the fuel supply channels.

16. The gas turbine according to claim 1, wherein the gas-turbine fuel nozzle is a dual-fuel firing pilot nozzle to which the fuel gas or liquid fuel is guided, the fuel gas that is combusted by a diffusion method is supplied to the fuel/sweep-fluid supply channels, and the liquid fuel that is combusted by the diffusion method is supplied to the fuel supply channels.

17. The gas turbine according to claim 1,
wherein the gas-turbine fuel nozzle is a main nozzle in which the fuel gas that is combusted by a premix method is supplied to the fuel/sweep-fluid supply channels, or the sweep fluid is supplied to the fuel/sweep-fluid supply channels; and
a plurality of the main nozzles are provided, and the sweep fluid is supplied to some of the main nozzles according to the operation of the gas turbine.

18. A gas-turbine plant comprising a gas turbine according to claim 1.

19. A gas-turbine plant according to claim 18, further comprising a gas-turbine outer case that encloses the gas turbine.

* * * * *